United States Patent [19]

Scuilli

[11] Patent Number: 4,758,836
[45] Date of Patent: Jul. 19, 1988

[54] INDUCTIVE COUPLING SYSTEM FOR THE BI-DIRECTIONAL TRANSMISSION OF DIGITAL DATA

[75] Inventor: Felice M. Scuilli, Pittsburgh, Pa.

[73] Assignee: Rockwell International Corporation, Pittsburgh, Pa.

[21] Appl. No.: 505,032

[22] Filed: Jun. 20, 1983

[51] Int. Cl.[4] .............................................. G08C 19/06
[52] U.S. Cl. ......................... 340/870.31; 340/870.02; 340/870.18; 340/825.54
[58] Field of Search ...................... 340/870.02, 870.03, 340/870.13, 870.14, 870.18, 870.31, 870.32, 870.34, 825.54, 825.63, 825.64, 505; 178/43; 371/69; 364/483; 55/5, 41; 179/82

[56] References Cited

U.S. PATENT DOCUMENTS

| | | |
|---|---|---|
| 3,290,675 | 12/1966 | Neild . |
| 3,441,923 | 4/1969 | King . |
| 3,530,449 | 9/1970 | Schroeder . |
| 3,569,833 | 3/1971 | Milton . |
| 3,656,112 | 4/1972 | Paull ............................... 340/870.02 |
| 3,657,717 | 4/1972 | Glantchnig et al. . |
| 3,662,758 | 5/1972 | Glover . |
| 3,689,885 | 9/1972 | Kaplan et al. . |
| 3,748,654 | 7/1973 | Sutherland ..................... 340/570.02 |
| 3,758,845 | 9/1973 | MacKelvie et al. . |
| 3,781,792 | 12/1973 | Birkin . |
| 3,806,904 | 4/1974 | Weinberger et al. . |
| 3,840,866 | 10/1974 | St. Clair et al. . |
| 3,852,726 | 12/1974 | Romanelli . |
| 3,872,455 | 3/1975 | Fuller et al. . |
| 3,959,772 | 5/1976 | Wakasa .......................... 340/310 R |
| 4,077,030 | 2/1978 | Helava ........................... 340/870.13 |
| 4,085,287 | 4/1978 | Kullman . |
| 4,119,948 | 10/1978 | Ward et al. . |
| 4,132,981 | 1/1979 | White . |
| 4,139,737 | 7/1979 | Shimada ......................... 340/870.02 |
| 4,150,358 | 4/1979 | Aviander . |
| 4,187,854 | 2/1980 | Hepp et al. . |
| 4,206,449 | 6/1980 | Galvin et al. . |
| 4,208,653 | 6/1980 | Abe . |
| 4,223,679 | 9/1980 | Schulman et al. . |
| 4,223,830 | 9/1980 | Walton . |

(List continued on next page.)

FOREIGN PATENT DOCUMENTS 1253826 11/1971 United Kingdom .

OTHER PUBLICATIONS

Holcomb et al., "Medical and Biological Engineering", vol. 7, No. 5, Sep. 1969, pp. 493-499 (first article).
Holcomb et al., "21st ACEMB", Houston, Tex., No. 18-21, 1968, p. 22 a 1, (second article).

Primary Examiner—John W. Caldwell, Sr.
Assistant Examiner—Tyrone Queen
Attorney, Agent, or Firm—Richard Speer; Albert G. Marriot; R. Lewis Gable

[57] ABSTRACT

A bi-directional, digital data transmission system is disclosed for transmitting an interrogation signal in a first direction from an interrogation unit to a data gathering transponder unit, and a data return signal in a second direction from the meter or data gathering transponder unit to the interrogation unit. This system comprises a single transformer having a primary winding coupled to the interrogation unit and a secondary winding coupled to the transponder unit. The interrogation unit generates an interrogation signal comprised of a first train of regularly occurring digital clock pulses and transmission interval pulses, each transmission interval pulse defining a transmission interval for the transmission of the data return signal. The transmission interval is set to be of a sufficient length to permit the transformer to desaturate to a level to permit efficient transmission of the data return signal to the interrogation unit. The transponder unit includes a data transmitting circuit responsive to the transmission interval pulses appearing at the secondary winding for generating and applying, during the transmission intervals, digital signals indicative of the gathered data to the secondary winding to be transmitted via the transformer to the interrogation unit.

86 Claims, 9 Drawing Sheets

U.S. PATENT DOCUMENTS

| | | |
|---|---|---|
| 4,236,068 | 11/1980 | Walton . |
| 4,237,900 | 12/1980 | Schulman et al. . |
| 4,316,262 | 2/1982 | Mizuta ............................ 340/870.02 |
| 4,333,072 | 6/1982 | Beigel ............................. 340/825.54 |
| 4,338,601 | 7/1982 | Nance-Kivel . |
| 4,345,146 | 8/1982 | Storey et al. . |
| 4,349,821 | 9/1982 | Vansca . |
| 4,354,190 | 10/1982 | Reschovsky ................... 340/870.32 |
| 4,355,361 | 10/1982 | Riggs et al. . |
| 4,360,918 | 11/1982 | Ruhnau et al. . |
| 4,361,838 | 11/1982 | Mizuta ............................ 340/870.02 |
| 4,384,228 | 5/1983 | Dias . |
| 4,388,524 | 6/1983 | Walton . |
| 4,399,437 | 8/1983 | Falck .............................. 340/825.54 |
| 4,439,764 | 3/1984 | York et al. . |
| 4,463,354 | 7/1984 | Sears .............................. 340/870.32 |
| 4,473,825 | 9/1984 | Walton ........................... 340/825.54 |
| 4,510,495 | 4/1985 | Sigrimis ......................... 340/825.54 |
| 4,517,563 | 5/1985 | Diamant ......................... 340/825.54 |
| 4,532,416 | 7/1985 | Berstein . |
| 4,608,552 | 8/1986 | Boutonnat et al. ............. 340/310 A |

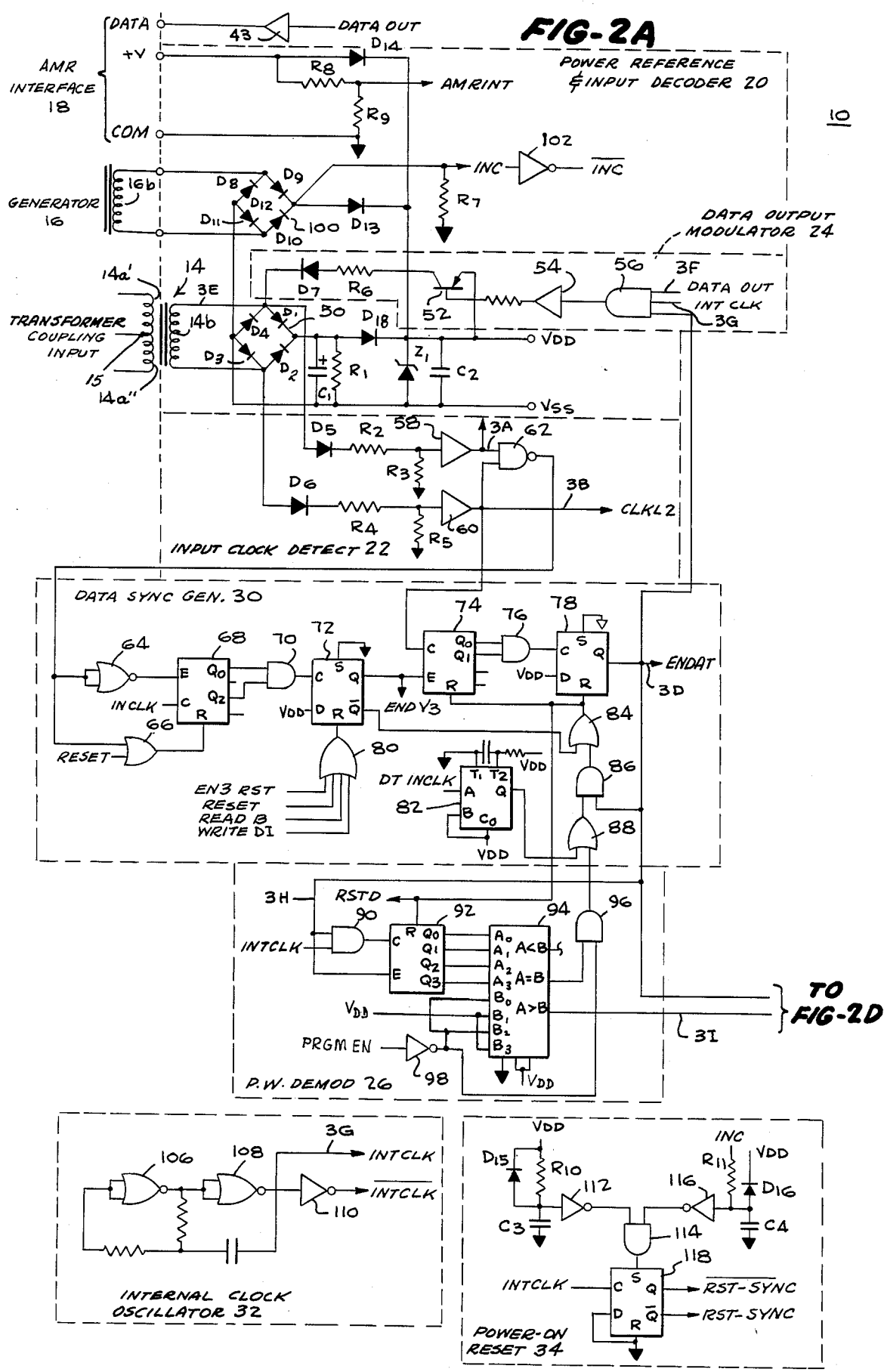

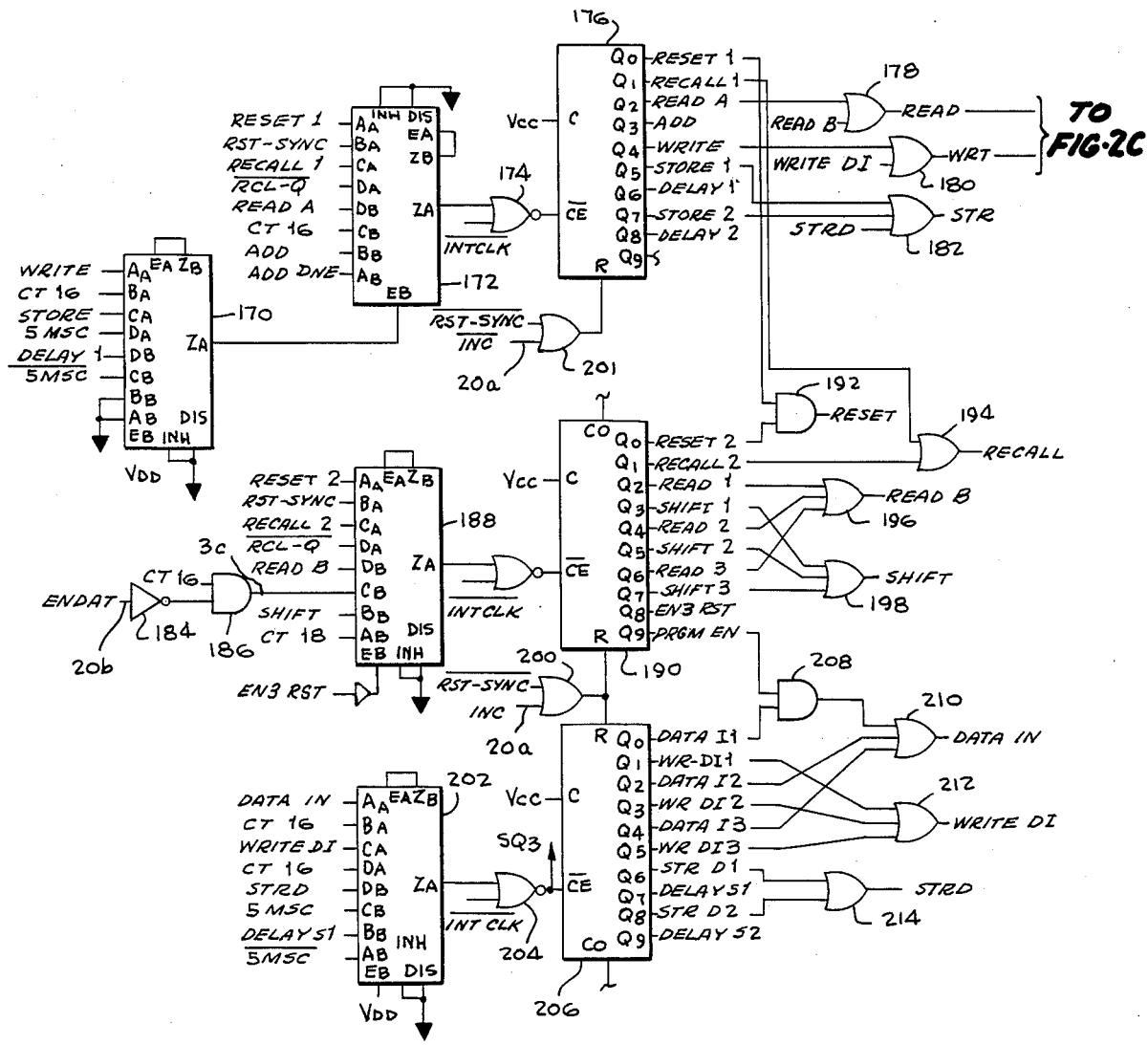

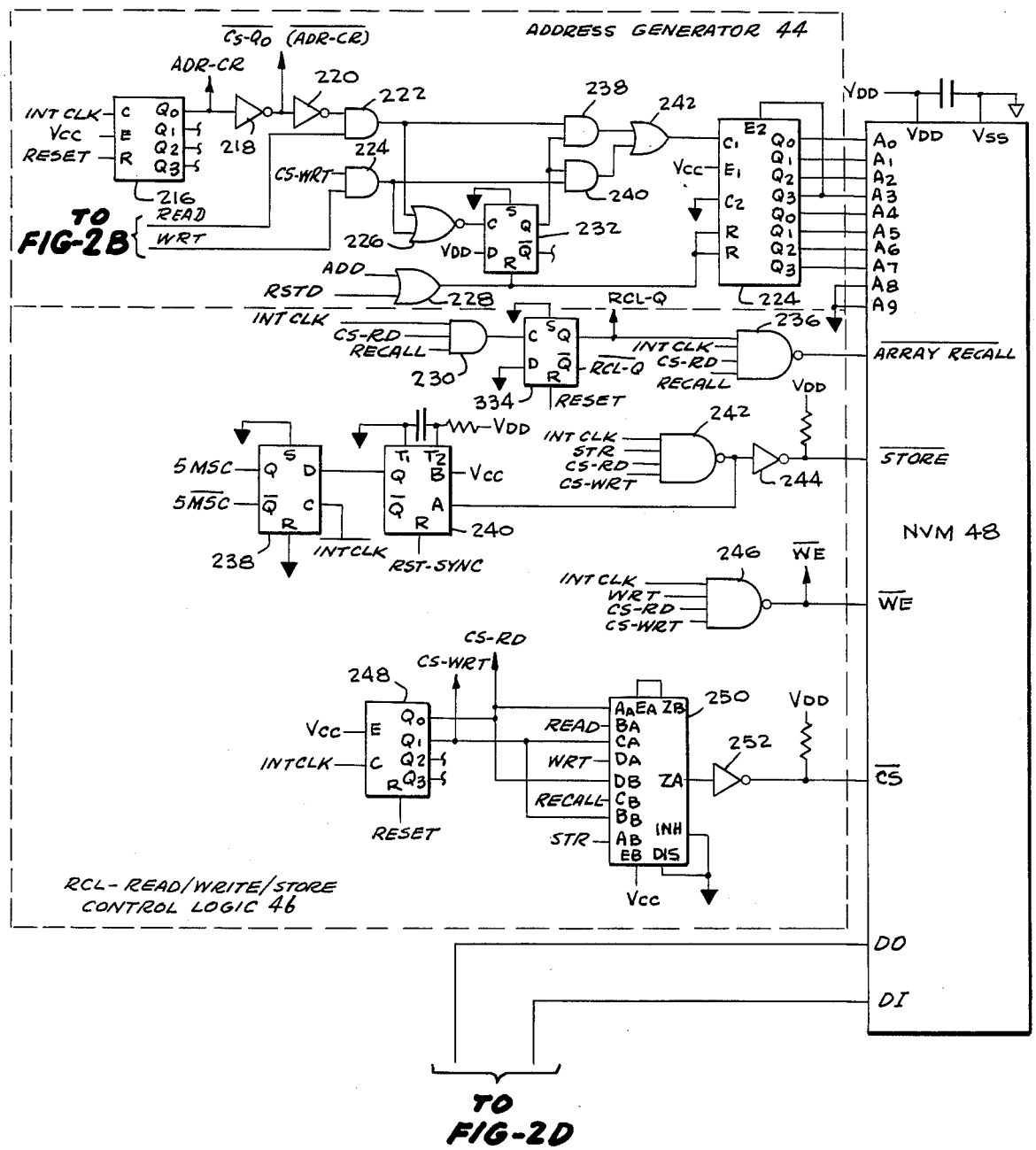

FIG-2D

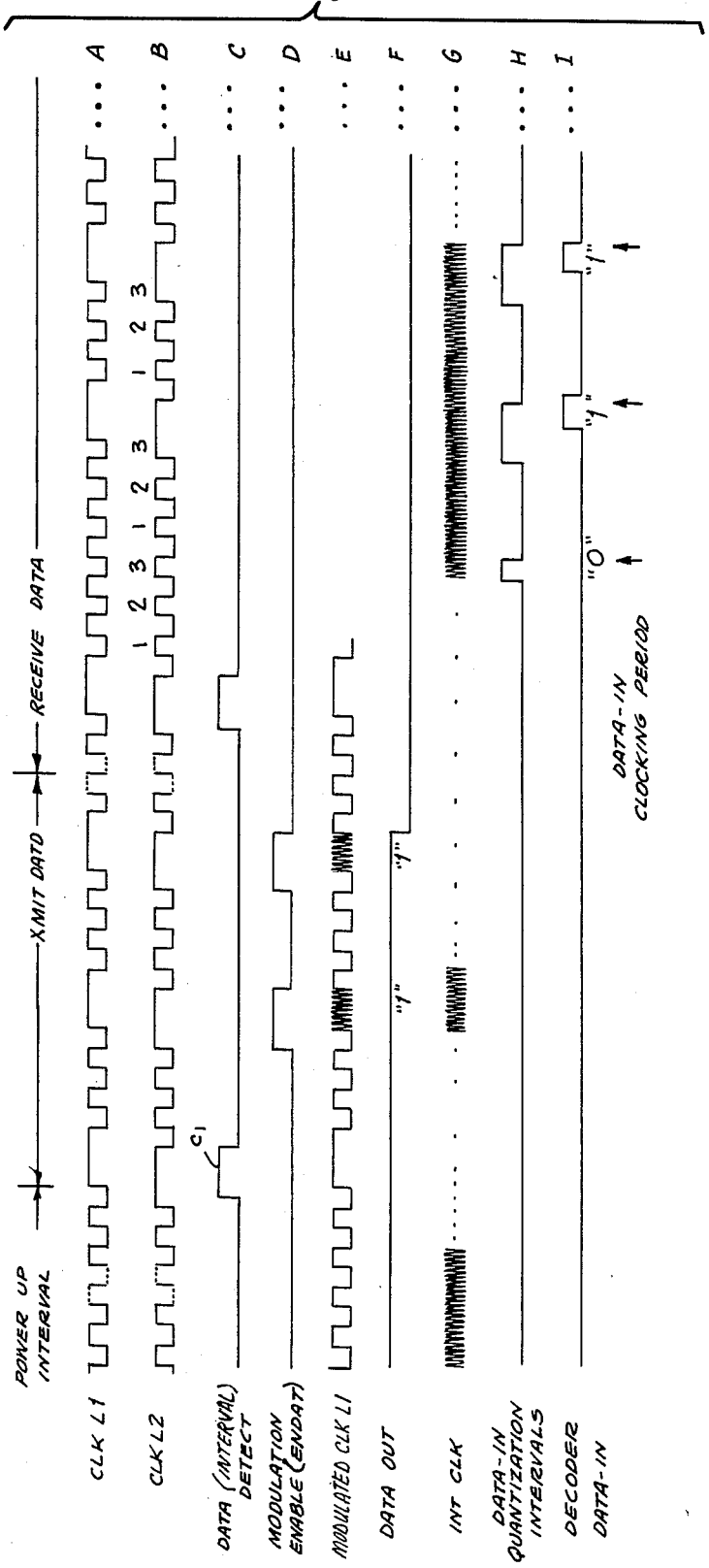

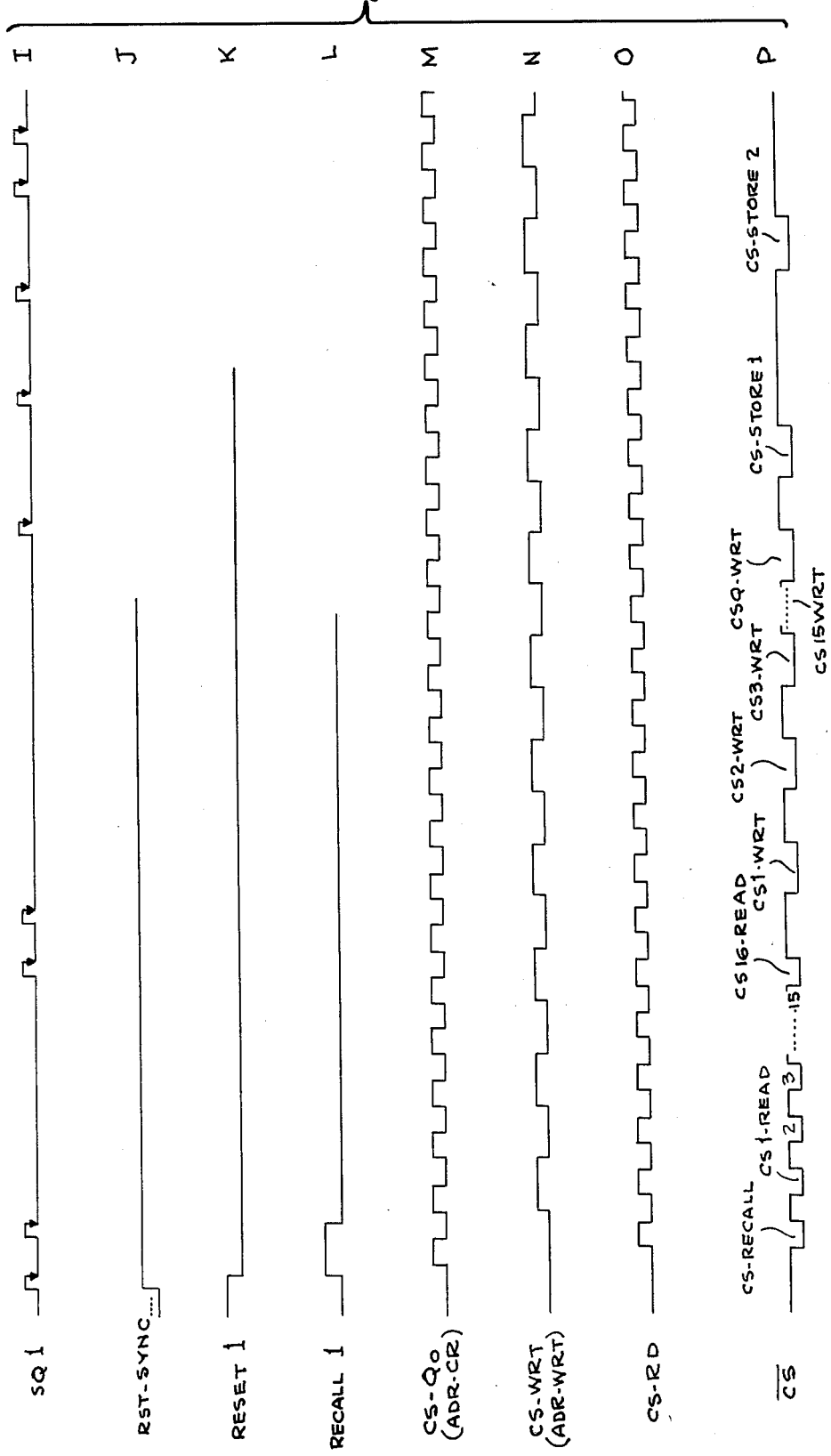

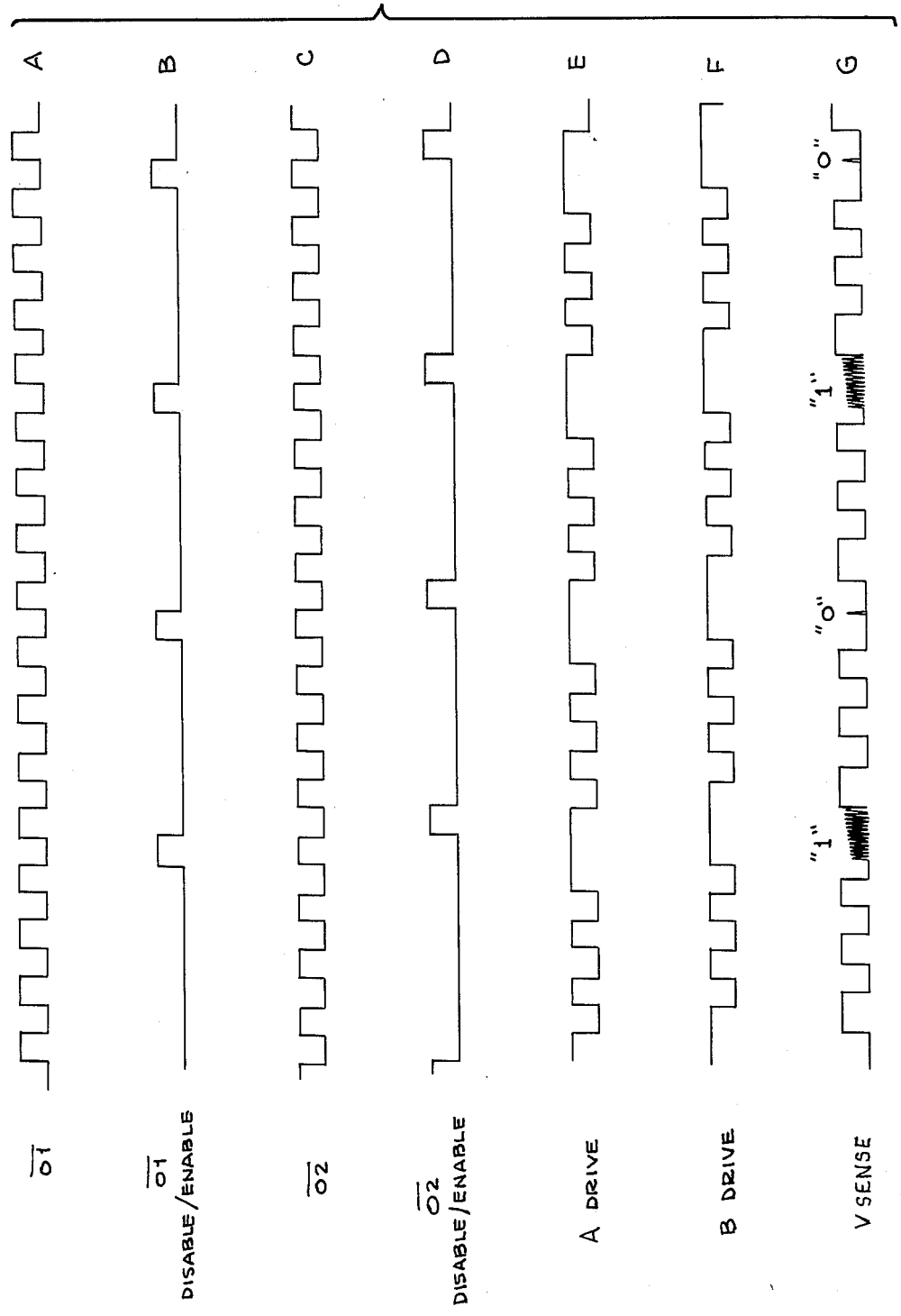

INDUCTIVE COUPLING SYSTEM FOR THE BI-DIRECTIONAL TRANSMISSION OF DIGITAL DATA

FIELD OF THE INVENTION

This invention relates to an inductive coupling system for bi-directionally transmitting data between an interrogation unit and a transponder unit and, in particular, to such an inductive coupling system for transferring digital data indicative of utility consumption, e.g., water, gas or electricity, from the transponder unit in one direction to the interrogation unit, and a power/clock signal and/or a data bearing signal in an opposite direction from the interrogation unit to the transponder unit.

DESCRIPTION OF THE PRIOR ART

It has been a long-standing problem of utility companies dealing with the distribution of such utilities as water, gas or electricity, for example, to obtain an indication of the utility consumption by each of its customers, so that customers may be accurately billed for their consumption. It has been a typical practice for the utility company to employ "meter readers" to visit each customer location or home and take the reading, by visually observing the meter and recording in tabulated form a hand-written record of the utility consumption and the corresponding customer. Such a method is very time-consuming and, thus, costly in that the meter reader must typically gain access to the interior of the customer's house, wherein the meter is located, and on many occasions will find the customer absent, thus requiring repeated return visits to secure the necessary reading.

U.S. Pat. No. 3,806,904 of Weinberger et al., assigned to the assignee of this invention, discloses a utility meter, illustratively a water meter, for measuring the flow of water to incrementally record upon a coupled, mechanical-type register, an indication of the amount of water consumed by the customer. Typically, the portable interrogation unit is carried by the meter reader to the customer's location and is coupled to an external receptacle, which is connected by a cable to the register disposed inside of the customer's home or place of business. Upon coupling of the unit to the external receptacle, a readout signal, indicative of the water consumption by the customer, is transmitted from the register to the interrogation unit.

The mechanical register associated with the water meter, as described in the Weinberger et al. patent, comprises a series of wheels, the positions of which indicate successive magnitudes, e.g., units, tens, hundreds, thousands, of the quantity of water consumed. For example, the water meter incrementally moves the register for each 100 or 1,000 gallons of water that the customer has consumed. An electrical signal is derived to indicate the position of each of the wheels and, thus, the water consumed by a plurality of resistance ladders, one associated with each wheel. Selected connections are made to the external receptacle disposed upon the exterior of the customer's home or place of business, whereby the utility reader may readily gain access to the mechanical register. In addition, a circuit-board or wiring matrix is disposed, illustratively within the external receptacle, that is so configured or wired to uniquely identify the customer.

In order to obtain a meter reading, the meter reader gains access to the remote receptacle by coupling a connector in the form of a gun through a removable face plate, whereby the interrogator gun including contacts is coupled with contacts within the external receptacle so that an electrical connection is made between the portable interrogation unit and the mechanical register associated with the utility meter. Upon insertion of the interrogating gun, the control logic associated with the portable interrogation unit, sequentially reads out or obtains an encoded readout signal from the resistance ladder associated with each of the wheels of the mechanical register, and a six-digit identification signal from the aforedescribed wiring matrix.

Contact problems are encountered in the interconnection made between the interrogator gun and the set of contacts within the external receptacle, and these mating sets of contacts must be protected by suitable coatings that will not be corroded by moisture or contaminants within the atmosphere. A further problem resides in the relatively expensive nature of encoding each utility meter with a unique identification number identifying the customer. The wiring matrix utilized in such a system typically is hand-wired to provide the unique six-digit customer identification number. Further, such a manufacturing process requires that the matrix be manufactured at the factory and, then, installed at the customer's location.

U.S. Pat. No. 3,840,866 of St. Claire et al. discloses a meter reading system that overcomes the contact problems of the type described above by transferring binary coded decimal signals indicative of the utility consumed by radiant energy emission. In particular, St. Claire et al. discloses a receiver and a fixed unit or transmitter. The fixed unit includes a decimal sequence controller which accesses each of four switches of the transmitter, whereby the decimal data indicative of the meter reading is read out through a complex of diodes to energize selectively one of four radiant energy transmission means. St. Claire et al. discloses such radiant energy means in the form of either an electromagnet and a corresponding reed switch, or a light source and a corresponding photo cell. In particular, the output of each of the four switches is coupled to a corresponding set of radiant energy means disposed in an array within the transmitter. The receiver has a similarly disposed array of receiving elements, i.e., either the reed switches or the photo cells, that are aligned to detect the radiant energy as generated by each of the corresponding radiant energy transmission means. The reed switches are illustratively connected to a binary to numeric converter that interprets the binary data indicative of the utility consumed and provides a corresponding digital display. In operation, the portable interrogator unit is disposed with respect to the transmitter such that the arrayed sets of electro magnetic relays and reed switches are aligned with each other and, then, a switch is closed in the portable unit to energize a starter electromagnet to close a related switch within the transmitter, whereby a transmitter battery is connected in circuit to energize the elements of the transmitter. Upon completion of the readout, the starter electromagnet is de-energized, whereby the transmitter battery is removed from circuit and the transmitter is de-energized. A drawback of the St. Claire et al. system relates to its use by the transmitter of a battery that has a finite life requiring periodic replacement. Even if a conventional AC source would be substituted for such a battery, there is still the possibility of power failure. In addition, St. Claire et al. employs decimal switches coupled to their meter, each such switch employing a wiper contact moving across one of ten contacts. Such encoder switches are subject to corrosion due to the presence of moisture or other contaminants in the atmosphere, unless coated with expensive metals such as gold. In particular, contact resistance occurs due to contamination such that the output signal prevents a transmission of a corresponding signal.

U.S Pat. No. 4,085,287 of Kullmann et al. discloses a solution for the problem incurred by the use of a battery or other electric power source within the transponder or transmitter associated with the utility meter. In particular, Kullmann et al. discloses an interrogation circuit that is coupled via a pin plug and corresponding socket receptacle to a transmitter associated with the meter. The meter is associated with four finger or wiper switches similar to those of the St. Claire et al. patent '866. The four switches represent the 0, 10, 100 and 1000 units of cubic feet of water as measured by the meter. Upon coupling of the pin plug and socket receptacle, the interrogation unit is actuated to transmit a clock/power signal via an input channel to the transmitter associated with the meter. The clock/power signal is rectified to charge a capacitor, whereby a DC voltage is developed to energize the circuit elements of the transmitter. In addition, the clock signals are used, not only to scan the four switches, but also to time the transmission of a digital signal from the transmitter to the interrogation unit in synchronism with the input clock signal. The output of the transmitter is developed from a code generator logic circuit that applies its output along an output channel within the pin plug and socket receptacle to the interrogation unit, the output channel being separate from the input channel. Each of the input and output channels includes a male/female type of connection, as is well known in the art. The output or return signal is in the form of a train of 16 characters, each comprised of four bits. Four of the 16 characters are used to provide data indicative of the position of the switches. The output as obtained from each switch is in the form of decimal binary data and is converted to binary coded signals to be, in turn, transmitted in a synchronous, serial fashion by the logic generator. The ten other remaining characters of the output signal of the transmitter relate to a unique code identifying the particular meter. The unique code is provided by a hard wire circuit dependent upon the selected interconnection of rows and columns of conductors. It is apparent that the code of a particular meter may not be readily changed or programmed without replacing the entire identifying code matrix. The system disclosed by the Kullmann et al. patent '287 would be subject to the problems associated with corrosion of its pin plug and socket receptacle, as well as its four decoder switches.

U.S. Pat. No. 4,132,981 of White, assigned to the assignee of this invention, provides a solution to those problems caused by the corrosion of the contacts of the pin plug and socket receptacle, as well as of the decoder wheel switches. The mechanical register as formed by the set of decoder wheel switches is replaced by an electronic counter and, in particular, a non-volatile MNOS memory that accumulates and stores counts indicative of the flow of the metered utility. In particular, the White patent '981 discloses a pulse generator coupled with the utility meter to provide a signal typically in the form of a pulse-like electrical signal indicative of the consumption of a given quantity of the utility. These pulses are applied to, stored within and accumulated by the non-volatile memory of a meter transponder. In addition, the memory can be programmed with a second word indicative of the particular meter being interrogated. The transponder includes the memory as well as a sequencing control logic circuit. The pulse generator is selectively coupled by the sequencing control logic to store and accumulate pulses in the non-volatile memory. The White patent '981 discloses a portable interrogation unit that may be carried to each customer location and coupled to the transponder to apply an interrogation signal to the transponder whereby a return signal indicative of the accumulated count is transmitted from the meter transponder to the interrogation unit. The interrogation signal is illustratively a burst of a clock signal of 30 KHz and serves to energize the circuit elements of the transponder. Similarly, each pulse derived from the pulse generator also energizes the circuit elements of the meter transponder, whereby the meter transponder does not require a separate power source. The interrogation unit applies its interrogation signal to the primary winding of an inductive coupling, whereas the secondary coil of the inductive coupling is associated with the meter transponder. To effect coupling, the primary and secondary windings are aligned with each other and the interrogation unit actuated to transmit its high frequency interrogation signal to the meter transponder. The meter transponder employs a distinct separate channel for the transmission of data from the meter transponder to the interrogation unit illustratively taking the form of a light emitting diode that is actuated to transmit a sequence of light bursts that are directed onto the base region of a light-responsive transistor, which is in turn coupled to the recording circuitry of the interrogation unit. While having many advantages over the prior art meter readers, the use of the aforedescribed light coupling is not entirely satisfactory in that lenses are required to focus the light from the light emitting diode onto the light responsive transistor, which lenses may be coated with dirt or become cracked in use.

Therefore, it is highly desirable to provide a method of coupling the interrogation unit to the meter transponder unit in a manner that the transmission of data will not be adversely effected by corrosion or the presence of dirt, the presence of which may be readily contemplated in the environment of many meter transponders The White patent '981 suggests the use of inductive coupling, but employs the inductive coupling to transmit only a power signal from the interrogation unit to the meter transponder. It is contemplated that a second inductive coupling could be used in lieu of the light coupling, but such additional inductive coupling would not only increase the expense of the meter transponder, but also would not ensure that the signals transmitted to and from the meter transponder are synchronized with each other.

SUMMARY OF THE INVENTION

Thus, an object of this invention is to provide a new and improved data transmitting system that avoids the problems of corrosion and contamination present in the prior art.

It is a further object of the present invention to provide a new and novel data transmission system utilizing an inductive coupler for the bi-directional transmission of data.

It is a still further object of this invention to provide a new and improved data transmission system for the transmission of digital data to a data transponder to effect a read out and transmission of the interrogated data via the same inductive coupler.

It is a still further object of this invention to provide a new and improved data transmission system for the transmission of digital data to a meter transponder from an interrogation unit to effect programming of the meter transponder of desired data illustratively taking the form of the meter reading and customer ID number at the time of meter installation.

It is a still further object of this invention to provide a new and improved bi-directional, digital data inductive coupling system particularly adapted for use with a portable interrogation unit and a meter transponder, wherein a single inductive coupler or transformer is employed to not only transmit an interrogation signal and/or a programming signal from the portable interrogation unit to the meter transponder, but a return data signal from the meter transponder to the portable interrogation unit.

In accordance with these and other objects of this invention, there is disclosed a bi-directional, digital data transmission system for transmitting an interrogation signal and/or programming signal in a first direction from an interrogation unit to a data gathering transponder unit, and a data return signal in a second direction from said data gathering or meter transponder to said interrogation unit. This system comprises a single transformer having a primary winding coupled to the interrogation unit and a secondary winding coupled to the meter transponder. The interrogation unit generates an interrogation signal comprised of a first train of regularly occurring digital clock pulses and transmission interval pulses, each transmission interval pulse defining a transmission interval for the transmission of the data return signal. The transmission interval is set to be of a sufficient length to permit the transformer to desaturate to a level to permit efficient transmission of the data return signal to the interrogation unit. The meter transponder includes a data transmitting circuit responsive to the transmission interval pulses appearing at the secondary winding for generating and applying during the transmission intervals digital signals indicative of the gathered data to the secondary winding to be transmitted via the transformer to the interrogation unit.

In a further aspect of this invention, the interrogation unit is not only operative in a data receive mode, but also in a data transmit mode. In particular, the interrogation unit modulates the interrogation signal and, in particular, selected of its clock signals with data to be transmitted to the meter transponder. In the illustrative embodiment, wherein this invention is adapted to interrogate data from utility meters, the transmitted data may be indicative of the particular ID number of manifestation of the meter being interrogated. In this manner, the meter transponder may be reprogrammed or programmed with an ID number indicative of the meter being interrogated.

In a further aspect of this invention, the meter transponder includes a power conversion circuit which is responsive to the clock signals of the interrogation signal to energize solely the elements of the meter transponder. In that illustrative embodiment, wherein this invention is used to store and accumulate pulses indicative of utility consumption, a generator is associated with the utility meter and generates a set of pulse-like signals, each signal being indicative of a measured utility flow. Each such pulse-like signal serves to energize the meter transponder, whereby the pulse-like signal is received and stored in a non-volatile memory. In order to read out, a portable interrogation unit is coupled by the inductive coupler to the meter transponder and an interrogation signal is applied thereto. The interrogation signal serves to energize the meter transponder and to synchronize the operations of the meter transponder with the clock signal of the interrogation signal. In particular, each of the transmission interval pulses clocks out a bit of data indicative of the consumed utility to be transmitted during a transmission interval.

BRIEF DESCRIPTION OF THE DRAWINGS

These and other objects and advantages of the present invention will become apparent by referring to the following detailed description and accompanying drawings, in which:

FIGS. 2A to 2D illustrate, when taken together, a detailed circuit diagram of the elements forming the meter transponder as shown diagramatically in FIG. 1;

FIGS. 3A to 3P show the signals and the timing thereof as provided by the circuit elements of the meter transponder as shown in FIGS. 2A to 2D;

FIGS. 5A to 5F show the signals and the timing thereof as generated by the circuit elements of the interrogation unit as shown in FIG. 4.

DESCRIPTION OF THE PREFERRED EMBODIMENT

Figure 1:
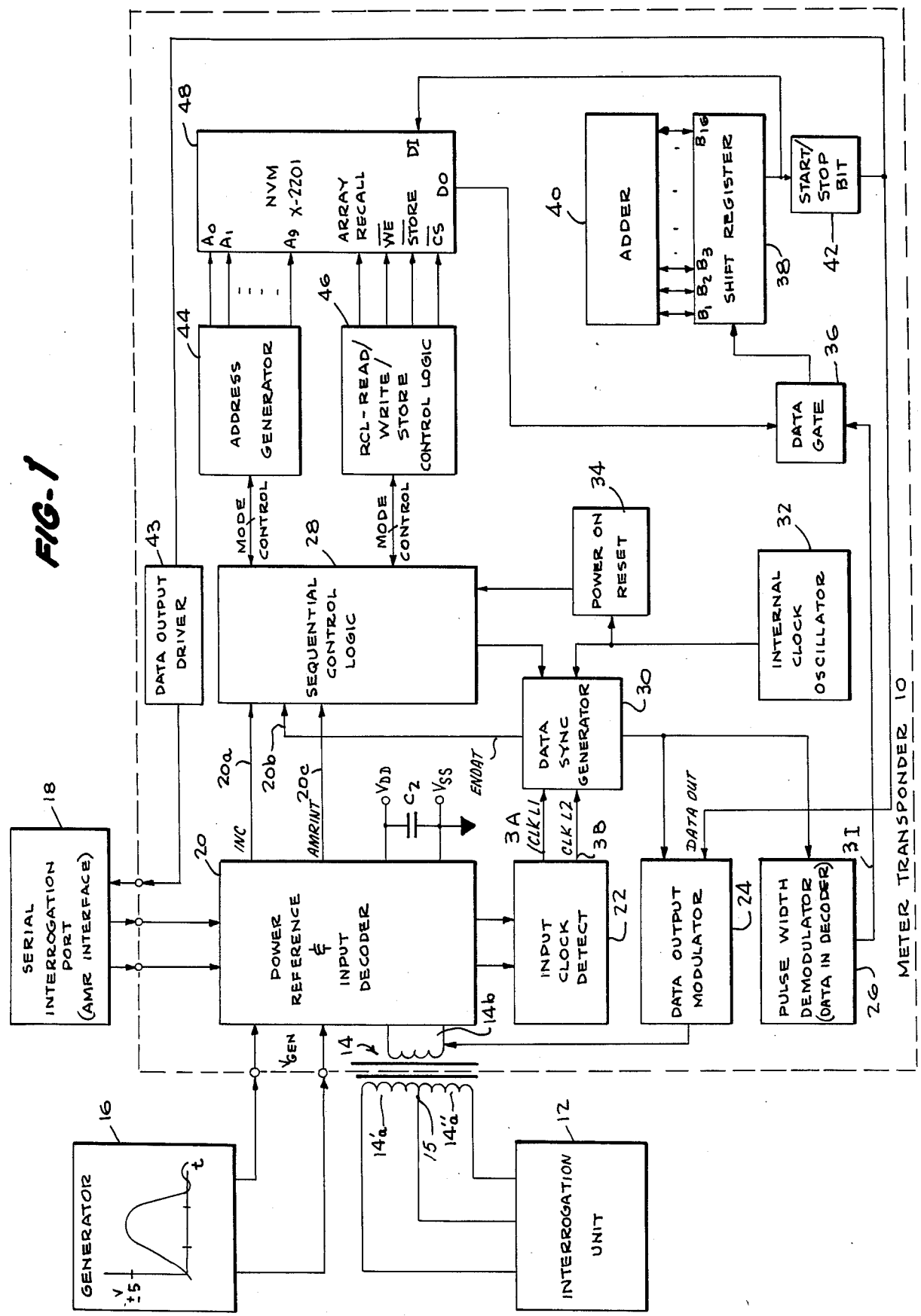
Figure 1 is a schematic diagram in block form showing the inductive coupling system of this invention for bi-directionally transmitting signals between an interrogation unit and a meter transponder.

With reference to the drawings and, in particular, to FIG. 1, there is shown an inductive coupling in the form of a center tapped transformer 14 for the bi-directional transmission of digital data between an interrogator unit 12 and a meter transponder 10. The meter transponder 10 is connected in circuit with a generator 16, which is mechanically coupled with a utility meter (not shown) to generate a series of pulse-like signals, each signal indicative of the consumption or flow of a utility, e.g., 100 or 1000 gallons of water. The meter transponder 10 is energized by each pulse-like signal derived from the generator 16 for a period sufficient to accumulate and store that pulse-like signal in a non-volatile memory (NVM) 48. The meter transponder 10 responds to each input pulse-like signal to increment a count as stored within the NVM 48 and, after incrementing that count, restoring the incremented count into an addressable location of the NVM 48. In a typical application, the generator 16 is directly and mechanically coupled to the utility meter wherever it is located within the building or home. The generator 16 is electrically connected by a pair of wires to the meter transponder 10 that may be mounted outside of the house, whereby it is readily accessible to meter readers. A meter reader carries the portable interrogator unit 12 that is typically battery powered to apply an interrogation signal via the inductive coupler 14 to the meter transponder 10, whereby the count indicative of the consumed utility, as stored in the non-volatile memory 48, is read out and transmitted via the inductive coupling 14 to the interrogator unit 12.

The inductive coupling, in the form of the center tapped transformer 14, serves to transmit the interrogation signal in a first direction from the interrogator unit 12 to the meter transponder 10 and, in return, to transmit a utility data return signal in a second opposite direction from the meter transponder 10 to the interrogator unit 12. As illustrated in FIG. 1, a primary winding 14a of the transformer 14 is coupled and is integral with the interrogator unit 12, whereas a secondary winding 14b of the transformer 14 is coupled to the circuitry of the meter transponder 10. Illustratively, the primary winding 14a may be mechanically mounted within a probe or gun that is mated with a receptacle of the meter transponder 10, whereby the primary and secondary windings 14a and 14b are inductively coupled with each other in close relationship, i.e., an air gap of approximately 0.02 to 0.10 inches is provided between the windings 14a and 14b.

The generator 16 continuously generates pulse-like signals, which are applied to and accumulated by the meter transponder 10 and, in particular, by its NVM 48. Meter readers periodically visit the meter location, typically once a month. In order to obtain a reading of the utility consumed and measured by the meter since the last reading, the meter reader couples the primary winding 14a with the secondary winding 14b as described above. Thereafter, the meter reader actuates the interrogator unit 12 to transmit its interrogation signal via the transformer 14 to the meter transponder 10. As will be explained in detail later, the meter transponder 10 uses the interrogation signal to energize its elements and to synchronize its signal processing with the clocking information contained within the interrogation signal. More specifically, the meter transponder 10 addresses that location within the NVM 48, wherein the count indicative of the consumed utility is stored, and reads out and transmits data indicative of that count as the utility data return signal to the interrogator unit 12. The interrogator unit 12 includes a memory, typically in the form of a cassette or a semi-conductor addressable memory for receiving and storing signals indicative of the utility consumed, as well as a number identifying the particular meter and/or customer.

The meter transponder 10 does not employ a separate power source such as a battery or an AC line voltage as would be found typically in home. If such a source of energy was provided and failed, the meter transponder 10 would be unable to accumulate and/or read out the stored consumed utility count from the NVM 48. Rather, the meter transponder 10 is adapted to be energized by the application of a pulse-like signal from the generator 16 or the application of an interrogation signal from the portable interrogator unit 12. In particular, the power reference and input decoder 20, as shown in FIG. 1, rectifies the input signals from either of the interrogator unit 12 or the generator 16 to provide energizing signals VDD and VSS to the circuit elements of the meter transponder 10 for a period sufficient to effect the various operations of the meter transponder 10 including storage of the consumed utility count within the NVM 48 and/or transmission of data to either of the interrogator unit 12 or a serial interrogation port 18. In an illustrative embodiment of this invention, the utility meter and its pulse generator may be of the type as described in U.S. Pat. No. 3,685,353 of Gestler, as assigned to the assignee of this invention; the output of the generator 16 may be of a wave form, as illustrated in FIG. 1, having a minimum amplitude of approximately +5 volts. It is understood that such an output signal provides sufficient energization to turn on the meter transponder 10, whereby the consumed utility count as stored within the NVM 48 is read out and incremented, before being restored within the designated location of the NVM 48.

In a manner similar to that contemplated by the above identified White patent '981, the meter transponder 10 is responsive to each pulse-like signal as derived from the generator 16 to cause the meter transponder 10 to increment the utility consumed count. In particular, the power reference and input decoder 20 is responsive to the pulse-like signals to apply an initiate signal INC to the sequential control logic 28, whereby a pulse increment mode of operation is implemented. In particular, an address generator 44 addresses that location wherein the utility consumed count indicative of the number of the previously received generator pulse-like signals is stored within the NVM 48 and transfers that count from its output terminal DO via the data gate 36 to the shift register 38. Thereafter, an adder 40 increments the utility consumed count by one, before the incremented count is transferred from the shift register 38 to the input terminal DI of the NVM 48 to be then stored in the count storage location of the NVM 48.

The interrogator unit 12 applies in a first or transmit data mode, an interrogation signal comprised of a train of clock signals to synchronize the operations of the meter transponder 10 and, in particular, to transmit a meter data return signal indicative of the stored utility consumed count to the interrogator unit 12. As will be explained in detail later, the input clock detect circuit 22 responds to the interrogation signal as transmitted by the inductive coupler 14 and appearing upon its secondary winding 14b, to recover a first clock signal CLK L1 and a second clock signal CLK L2, as shown in FIGS. 3A and 3B. These clock signals are applied to a data sync generator 30 that serves to synchronize the utility data return signal with respect to the interrogation signal. To transmit data indicative of the utility consumed count from the meter transponder 10, as shown in FIG. 1, the control logic 46 effects a readout of the addressed data from the NVM 48 to transfer that data to the shift register 38. Upon being read out from the shift register 38, a start and stop bit is applied to the serial digital signal by a start/stop bit circuit 42 before being applied to the data output modulator 24. The data output modulator 24 applies the utility data return signal, as shown in FIG. 3E, to the secondary winding 14b to be transmitted to the interrogation unit 12.

The use of a single inductive coupler or transformer 14 is permitted in that the transmission of the interrogation signal in a first direction to the meter transponder 10 is timed or synchronized with respect to the transmission of the utility data return signal, e.g., data indicative of utility consumed count in the second direction. Without synchronization, the inductive coupler 14 would saturate to a degree that would require an inordinate amount of power for data transmission in either the first or second directions. Thus, it is contemplated that the prevention or, more accurately, the reduction of the level of saturation is indeed significant to the illustrative embodiment shown in FIG. 1, e.g., the use of a portable interrogator unit 12 as would be typically battery powered to interrogate a meter transponder 10 that depends solely upon an inputted signal to provide energization for a limited period of time. As will be explained, transmission intervals are established within the interrogation signal during which the inductive coupler 14 is permitted to assume a relatively desaturated state that permits transmission of the utility data return signals in the second, opposite direction to the interrogator unit 12. As a result, the power required to transmit data in the first and second directions between the meter transponder 10 and the interrogator unit 12 is minimized.

As illustrated in FIG. 1, the interrogator unit 12 is operative in a first or transmit data mode to transmit its interrogation signal to the meter transponder 10, whereby data indicative of the utility consumed count may be transmitted as the utility data return signal from the meter transponder 10 to the interrogator unit 12. The interrogator unit 12 and meter transponder 10 are operative in a second or receive data mode, wherein the interrogator unit 12 modulates with data the power/clock signal in a manner that may be decoded by the meter transponder 10; this data as transmitted in the first direction from the interrogator unit 12 to the meter transponder 10 is decoded and subsequently stored within the NVM 48. Illustratively, the received data may take the form of a customer or meter identification number, as well as the actual reading on the meter's mechanical register at the time of installation of the meter transponder 10. In this way, the NVM 48 is not required to be pre-programmed at the factory, but may be later programmed and reprogrammed with a new meter identification number by the interrogator unit 12 as the meter and/or the customer associated with the meter transponder 10 changes. For example, the meter identification number would identify each transponder and its meter as being related to a particular customer so that the utility consumed could be calculated and a corresponding bill directed to the identified customer. To this end, the power/clock signal transmitted from the interrogator unit 12 is modulated with a new meter identification number that is received by the data sync generator 30 and applied to a pulse width demodulator 26 to provide decoded data indicative of the number as supplied via a data gate 36 to the shift register 38. Thereafter, the shift register 38, under the control of the sequential control logic 28, shifts the demodulated data into a location of the NVM 48 addressed to receive the meter identification number.

In addition, there is disclosed an internal clock oscillator 32 that is energized by the power reference and input decoder 20 to generate the relatively high frequency clock signal INT CLK, as shown in FIG. 3G; the clock signal INT CLK has a frequency typically in the order of 200 KHz. The high frequency output of the internal clock oscillator 32 contrasts to the frequency of the clock signals CLK L1 and CLK L2 as generated by the interrogator unit 12 and appearing as the output of the input clock detector 22; the common frequency of the clock signals CLK L1 and CLK L2 is illustratively in the order of 20 KHz.

Referring now to FIGS. 2A and 3, the basic operation of the inductive coupler of this invention and, in particular, the transformer 14 to bi-directionally transmit data between the interrogator unit 12 and the meter transponder 10 will be explained now in greater detail. The interrogator unit 12 generates the pair of essentially complimentary clock signals CLK L1 and CLK L2 that are shifted in phase with respect to each other approximately 180° as shown in FIGS. 3A and 3B. In FIG. 2A, these outputs are marked with the notations 3A and 3B indicating that the signals, as shown in FIGS. 3A and 3B, appear at these points in circuits. The signals, as graphically shown in FIGS. 3A to 3P, appear at various points within the circuit diagram as are marked with corresponding numerals identifying their figure number in a manner as explained above. The clock signals CLK L1 and CLK L2 are applied respectively to the primary coils 14a' and 14a" of the primary winding 14a of the transformer 14. The secondary winding 14b' applies the inductively coupled complimentary clock signals to a diode bridge 50 comprised of diodes D1, D2, D3 and D4, connected as is well known in the art, to provide a positive phase of the signals appearing upon the secondary winding 14b at the node of the bridge between diodes D3 and D4. The positive phase of the signal is the clock signal CLK L1, as shown in FIG. 3A, whereas the negative phase, as appears at the node between diodes D1 and D2, is the clock signal CLK L2, as shown in FIG. 3B. The clock signals are rectified and separated as described above due to the selection of a center tap primary winding 14a, wherein an appropriate positive voltage is applied to its center tap 16.

The outputs of the bridge 100 are applied respectively to a first path comprising diode D5, resistor R2 and inverter 58 to provide the first clock signal CLK L1 and to a second path comprised of diode D6, resistor R4 and inverter 60 to provide the second clock signal CLK L2. Each of the clock signals CLK L1 and CLK L2 is essentially a square wave clock signal and is applied to the power reference and input decoder 20, which rectifies and thereafter charges a capacitor C2 to a level as set by Zener diode Z1 that will permit energization of the circuit elements of the meter transponder 10, as shown in FIG. 1. In particular, a full wave rectification circuit is formed by the diodes D2 and D3 in combination with capacitor C1 and resistor R 1, whereby the capacitor C1 is positively charged. The Zener diode Z1 serves to regulate the voltage as it appears upon the capacitor C2.

As illustrated in FIGS. 3A and 3B, the complimentary clock signals CLK L1 and CLK L2 are generated for a power-up interval sufficient to fully charge the capacitor C2. Thereafter, a selected pulse is removed (as will be explained) from the clock signals CLK L1 and CLK L2 to provide a relatively wide or elongated pulse that serves to define a modulation or transmission interval as shown in FIG. 3D. As will be explained, the coincidence of the expanded pulses of the clock signal CLK L1 and CLK L2 is made to define the transmission interval. The modulation interval is that period during which data may be modulated by the data output modulator 24 and transmitted in the second direction from the meter transponder 10 via the transformer 14 to the interrogator unit 12. It is evident from FIGS. 3A, 3B and 3D, that during the transmission intervals, that each terminal of the secondary winding 14b is at its relatively low voltage or ground reference level, whereby the transformer 14 is disposed in a relatively unsaturated state, i.e., no current flows through either of the primary and secondary windings 14a and 14b, and the core of the transformer 14 is not saturated. In an illustrative embodiment of this invention, the transformer 14 is manufactured using a pot core material such as the FERROXCUBE 3C8 linear ferrite that permits the secondary winding 14b to be included within the meter transmitter 10, while the primary winding 14a is connected to the interrogator unit 12. Such a transformer desaturates in a time period in the order of a small fraction (illustratively less than 20%) of a full cycle of the interrogation signal to a level that permits the transmission of data in the second direction from the meter transponder 10 to the interrogator unit 12. Thus, as shown in FIG. 3E, desaturation occurs illustratively during the first 20% of the transmission interval, leaving the remainder of this interval for the transmission of the return data signal.

During the data transmission interval, a modulation enable signal ENDAT, as shown in FIG. 3D, is generated whereby digital data in the form of 0's and 1's may be transmitted one bit at a time in the second direction. In particular, an AND gate 56 of the data output modulator 24, as shown in FIG. 2, is selectively enabled during the modulation intervals to permit the application of the relatively high frequency internal clock signal INT CLK, as shown in FIG. 3G, to be generated in a series of bursts whereby the presence of a high frequency signal burst indicates a "1" and its absence a "0". The transmitted data modulates the first clock signal CLK L1 as shown in FIG. 3E and is coupled to the primary winding 14a to be demodulated by interrogator unit 12 to provide a sequence of 1's or 0's the as shown in FIG. 3F. In particular, the data signal, as shown in FIG. 3F, is anded with each of the enable signals ENDAT, as shown in FIG. 3D, and the internal clock signal INT CLK to selectively supply the signal burst via an inverter 54 and a resistor R6 to the base of a drive transistor 52. In turn, the collector of the transistor 52 applies an output via resistor R6 and a protective diode D7 to the transformer winding 14b of the transformer 14.

Referring again to FIG. 1, the meter transponder 10 may also be coupled to each of the pulse generator 16 associated with the utility meter or via the interface 18 to an automatic meter reader (AMR) interface 18. Considering now the processing of the pulse-like signals as derived from the generator 16, it is realized that each pulse-like signal is indicative of the flow of a given quantity of the utility. As seen in FIG. 1, output pulse-like signals of the pulse generator 16 are applied to the meter transponder 10 and, in particular, to its power reference input decoder 20 which recognizes the generator input and applies a signal INC over line 20a to a sequential control logic 28 which causes the meter transponder 10 to increment the stored count within the NVM 48 for each pulse-like signal received from the generator 16. Thus, the NVM 48 is responsive to each pulse-like signal to increment the stored utility consumed count by one before restoring the incremented count in a known addressable location of the NVM 48. The power reference and input decoder 20 also recognizes that an input has been made through the AMR interface 18 to effect the operation of the meter transponder 10 in a corresponding mode. The AMR interface 18 may be connected with an AMR as would be disposed at a central location and coupled to a plurality of meter transponders 10 over suitable conduits such as power lines or TV cables. The AMR is capable of sequentially accessing each of its meter transponders 10 to obtain a read out of the utility consumed count as stored within their NVM 48. The meter transponder 10 and, in particular, its power reference and input decoder 20, is responsive to the inputs as derived from each of the AMR interface 18, the generator 16 and the interrogator unit 12 to generate and apply corresponding signals AMRINT, ENDAT and INC upon lines 20c, 20b and 20a to the sequential control logic 28, which controls the sequence of operation of the meter transponder 10, dependent upon which of the port, generator or interrogator unit that may be supplying its signals to the meter transponder 10. Typically, the generator 16 is permanently coupled to the meter transponder 10 and upon input of its pulse-like signal, the power reference and input decoder 20 applies an INC signal to the sequential control logic 28 which causes the indication stored as the utility consumed count within an addressable location of the NVM 48 to be incremented by 1, before being restored in the addressable location. In particular, the sequential control logic 28 causes the address generator 44 to address that location of the NVM 48 wherein the count is stored.

The NVM 48 includes two memories; the first memory is a non-volatile or shadow memory, and the second is a volatile random access memory (RAM). An RCL/READ/WRITE/STORE control logic 46 applies a signal to the $\overline{\text{ARRAY RECALL}}$ input of the NVM 48 to transfer data from its non-volatile memory to its RAM. Then, the control logic 46 applies a set of clocking signals to the input $\overline{\text{CS}}$ of the NVM 48 to thereby transfer data from the addressed location of its RAM via the data gate 36 and into the shift register 38. Next, the sequential control logic 28 issues an increment or ADD command to the adder 40, whereby the count stored within the shift register 38 is shifted in parallel to the adder 40, wherein the count is incremented by one and restored within the shift register 38. Thereafter, the incremented count is shifted from the shift register 38 to be restored within the NVM 48. A single pulse-like signal outputted by the generator 16 serves to energize the elements of the meter transponder 10 for a period of time sufficient to permit the aforementioned steps of reading, incrementing and restoring of the accumulated pulse count. The control logic 46 transfers the contents of the RAM, including the incremented count, to the shadow or non-volatile memory, before the end of the generator's pulse-like signal and the de-energization of the meter transponder 10.

The meter transponder 10 is coupled by the AMR interface 18 to be interrogated by the AMR, whereby the contents of the NVM 48 and, in particular, the utility consumed count is read out and transmitted via the AMR interface 18 and the interconnecting conduit to a centrally disposed AMR. As will be explained in detail later, the AMR transmits via the AMR interface 18, an interrogation signal to the power reference and input decoder 20, which responds to energize the elements of the meter transponder 10, as well as apply an initiate signal in the form of the AMR INT signal to the sequential control logic 28 to initiate the read out of the count from the NVM 48 via the data gate to the shift register 38 and, thereafter, the transmission of the count via a start/stop bit circuit 42, a data output driver 43 and the AMR interface 18 to the centrally disposed AMR.

The meter transponder 10 and the interrogator unit 12 are operative in a first or data transmitting mode and in a second or data receive mode. In the data transmitting mode, the interrogator unit 12 is carried by the meter reader to a building or location, where the utility is to be read. The interrogator unit 12 is a relatively light weight unit having a housing and being connected by a suitable cable to the primary winding 14a, which may illustratively be disposed within a gun. The nozzle of the gun containing the primary winding 14a is adapted to be received within a receptacle housing the secondary winding 14b, whereby the primary and secondary windings 14a and 14b may be brought into an inductively coupled relationship. The meter reader may be only interested in interrogating the meter transponder 10 and of obtaining a read out from the NVM 48 of the count indicative of the consumed utility. After obtaining the read out of the consumed utility, the meter reader decouples the gun containing the primary winding 14a and proceeds to the next location, at which he makes a further meter reading. If, the meter reader wishes to program or reprogram the identification number of the particular meter transponder 10 and its meter, the meter reader leaves the primary winding 14a inductively coupled with the secondary winding 14b and the meter transponder 10 sequences automatically to the second or received data mode.

The second mode of operation is a programming mode, which is typically used at the initial installation of the meter transponder 10 to program the meter transponder 10 with the meter or customer ID and the meter reading at the time of installation. In the second mode of operation, the meter reader controls the interrogator unit 12 to modulate the complimentary clock signals CLK L1 and CLK L2, as shown on the right hand side of FIGS. 3A and 3B. As seen in FIG. 1, the modulated complimentary clock signals are detected by the input clock detect 22 and applied to the data sync generator 30, which outputs a pulse modulated signal as shown in FIG. 3H. The data sync generator 30 identifies each third pulse, as will be explained, and outputs a signal of a corresponding width as seen in FIG. 3H. The pulse width modulated signal is in turn applied to the pulse width demodulator 26 which compares the width of the inputted signal to a given reference and, if greater, generates a "1" signal and, if less, generates a "0" signal, as shown in FIG. 3I. The serial train of pulses outputted by the pulse-width demodulator 26 is applied via the data gate 36 and serially shifted into the shift register 38. Illustratively, the serial output takes the form of three sets of 16 bit pulse trains. In the second or receive data mode of operation, the sequential control logic 28 actuates the RCL-READ/WRITE/STORE control logic 46 to enable the write enable terminal $\overline{WE}$ of the NVM 48, whereby the three sets of 16 bit signals are serially shifted out of the shift register 38 and written into a location of the NVM 48 as addressed by the address generator 44. After the transmission of the data signal, typically in the form of the meter reading and customer or meter ID, the meter reader removes the gun containing the primary winding 14a, whereby the meter transponder 10 is de-energized. Before de-energization, the sequential control logic 28 and the control logic 46 enables the store input of the NVM 48, whereby the new ID is transferred from the RAM to the non-volatile or shadow memory of the NVM 48.

Figure 2D:
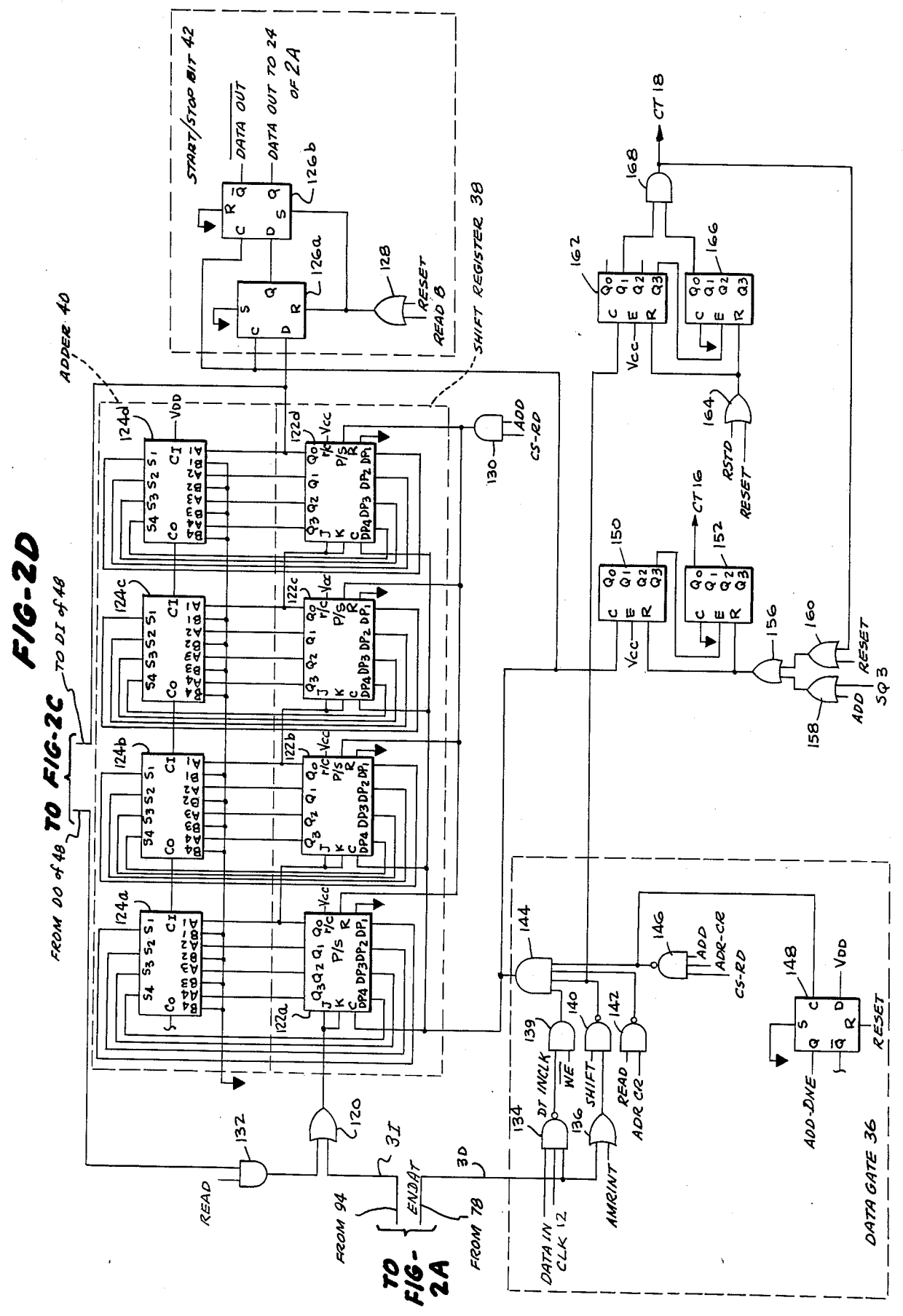

Referring again to FIGS. 2A, 2B, 2C and 2D, a more detailed explanation of the operation of the meter transponder circuitry will be given paying particular attention to the structure and operation of the circuitry for modulating and demodulating the signals transmitted bi-directionally through the inductive coupler 14. As explained above, the clock signals CLK L1 and CLK L2 are applied, as shown in FIG. 2A, to the data sync generator 30 which provides an output signal ENDAT as shown in FIG. 3D that defines the period of transmission of data from the meter transponder 10 to the interrogator unit 12. The period of transmission, as noted above, is that period in which the inductive coupler 14 is established at a relatively desaturated condition to permit bi-directional transmission without expenditure of undue amounts of power. Thus, it is contemplated that the meter transponder 10 that is energized by its power reference and input decoder 20, in response to the application of clock signals and the subsequent charging of capacitor C1, may transmit a bit of a digital signal during the transmission interval with a relatively low power level that is a fraction of the available energy stored in capacitor C1. In this regard, it is understood that the meter transponder 10 has no other power source other than the voltage as stored upon capacitor C1 of the power reference input decoder 20. The clock signals CLK L1 and CLK L2 are applied to an AND gate 62, as shown in FIG. 2A, to generate a coincidence signal, which is applied via an OR gate 66 to reset a counter 68. The counter 68 counts the relatively high frequency internal clock INT CLK, as shown in FIG. 3G, and generated by the internal clock oscillator 32. The internal clock oscillator 32 is comprised of a pair of NOR gates 106 and 108 interconnected by appropriate resistors and capacitors in a manner well known in the art to generate the high frequency clock signals INT CLK and $\overline{INT\ CLK}$. The coincidence signal is applied via the NOR gate 64 to the enable input of the counter 68, which functions to determine whether the pulse-width of the coincidence signal is greater than a predetermined number of the high frequency clock signals INT CLK, e.g., five counts. If the coincidence signal corresponding to the occurrence of each third, elongated pulse of the clock signals CLK L1 and CLK L2 is of sufficient duration, the counter 68 generates outputs upon its Q0 and Q2 outputs, whereby NAND gate 70 is enabled to clock the flip-flop 72. The first occurrence of a coincidence signal, as outputted from the AND gate 62 and shown in FIG. 3C by notation C1, indicates the start of the first or transmit data mode.

The flip-flop 72 of the data sync generator 30 is reset upon the occurrence of a number of conditions including the generation of a RESET signal from the power-on reset circuit 34. As shown in FIG. 2A, upon the establishment of the voltages VDD and VSS across capacitor C2, capacitors C3 and C4 of the circuit 34 respectively, charge through resistors R10 and R11 to enable AND gate 114, whereby a flip-flop 118 is set upon the occurrence of the next high frequency clock signal. A reset signal RST-SYNC is generated, as seen in FIG. 3J. The RST-SYNC signal is applied, as shown in FIG. 2B, via a NOR gate 200 to a decade counter 190, whereby upon the occurrence of the next high frequency clock signal, the decade counter 190 outputs upon its Q0 output a RESET 2 signal, whereby a RESET signal is generated from the AND gate 192. As seen in FIG. 2A, the RESET signal is applied via NOR gate 80 to reset the flip-flop 72. The reset flip-flop 72 responds to a clock input to enable a divide-by-three counter 74, which is clocked by the clock signal CLK L2. Upon the occurrence of the third clock signal of the CLK L2 signal, an AND gate 76 will clock the flip-flop 78 to force its Q output to generate the ENDAT signal. Upon the falling of the clock signal CLK L2, the ENDAT signal will also fall.

The ENDAT signal, as generated by the data sync generator 30, is applied to the sequential control logic 28, as shown in FIG. 2B, to operate the meter transponder 10 in its first or transmit data mode, whereby the data is read out of the NVM 48 and shifted, first to the shift register 38 and, therefrom, to the data output modulator 24 to be modulated and to be applied bit by bit to the secondary winding 14b during the transmit interval as explained above. As shown in FIG. 2B, the ENDAT signal is applied via an inverter 184 and an AND gate 186 to an input CB of an AND/OR invert gate 188. As shown in FIG. 2C, the RESET signal also resets a counter 216, whereby the high frequency internal clock signal INT CLK is applied to the clock input of the counter 216 to provide an output clock signal ADR-CR as seen in FIG. 3M. The clock signal ADR-CR is applied as shown in FIG. 2D via NAND gate 142 and AND gate 144 to clock a counter comprised of counters 150 and 152. Upon the occurrence of the 16th pulse of the ADR-CR clock, the Q0 output of the counter 152 provides a signal CT16 that enables the AND gate 186, as shown in FIG. 2B, to apply the input to the CB input of the AND/OR invert gate 188. As a result, the gate's output goes high, whereby upon the occurrence of the next high frequency clock signal INT CLK, the decade counter 190 is clocked to its next output state.

The reset signal $\overline{\text{RST-SYNC}}$ is applied via the NOR gate 200 in the absence of the increment signal INC as would occur when the generator 16 outputs a pulse. Thus, the reset signal RST-SYNC resets the decade counter 190 to provide an output from its Q0 terminal, which is applied to the AND gate 192 to provide the RESET signal, whereby the various logic elements of the meter transponder 10, including the counters 150 and 152, are reset. Upon the occurrence of the next 16 ADR-CR clock pulses, the decade counter 190 is again clocked to provide an output on its Q1 terminal, whereby OR gate 194 applies a RECALL signal to AND gate 230, as seen in FIG. 2C. As a result, a signal is applied to the array recall input of the NVM 48, whereby data, illustratively 48 bits of data, are transferred from the non-volatile or shadow memory to the RAM of the NVM 48.

Upon being clocked again, the decade counter 190 applies from its Q2 output a READ 1 signal to a NOR gate 196, which outputs a READ B signal to NOR gate 178, whereby the READ signal is applied to an input of an AND/OR invert gate 250, as shown in FIG. 2C. The clock signal CS-WRT, as shown in FIG. 3N, is applied to another input of the gate 250, whereby 16 clock signals are output from the gate 250 and applied to the Chip Select input of the NVM 48 to effect the reading out of 16 bits of data from the RAM of the NVM 48; this data is transmitted via AND gate 132 and OR gate 120 to the shift register 38, as shown in FIG. 2D.

As shown in FIG. 2C, a counter 248 is used to generate a pair of clock signals CS-WRT and CS-RD. This counter 248 is clocked by the high frequency internal clock signal INT CLK and is reset by the RESET signal as generated by the AND gate 192, as shown in FIG. 2B. The clock signals CS-WRT and CS-RD, as shown in FIGS. 3N and 3O, are applied to the AND-/OR invert gate 250, as shown in FIG. 2C, whose output is inverted by inverter 252 to provide a clock signal CS, as shown in FIG. 3P. The clock signal CS is applied to the chip select input $\overline{\text{CS}}$ of the NVM 48 and serves to clock the various reading, writing and storing functions of the NVM 48 dependent upon which of the READ, WRT, RECALL or STR signals is applied to the gate 250.

As shown in FIG. 3P, a sequence of CS signals is generated including a single CS recall signal, 16 CS read signals, 16 CS write signals and 2 CS store signals. As explained above, the CS signal enables the NVM 48 to receive the array recall signal, whereby data is transferred from its shadow or non-volatile memory to its RAM. Thereafter, the READ signal is applied to the gate 250, whereby 16 CS signals are applied to clock the NVM 48 to read out 16 bits of the data to be shifted into the serial shift register 38. After the reading out of 16 bits, a further CT 16 signal is applied to the AND gate 186, whereby the decade counter 190 is incremented to provide an output from its Q3 terminal, whereby a SHIFT signal is developed at the output of the OR gate 198 and applied to the NAND gate 140 associated with the shift register 38, as shown in FIG. 2D. As a result, the signal ENDAT as seen in FIG. 3D is applied via AND gate 144 to effect a shift of the data stored within the shift register 38 via the start/stop bit circuit 42 to the data output modulator 24 and, in particular, to the AND gate 56, as seen in FIG. 2A, whereby the output data is modulated as explained above and transmitted via the inductive coupler 14 to the interrogator unit 12.

Referring again to FIG. 2B, upon the completion of the 16 pulses of the CS signal, the decade counter 190 is shifted to output from its Q4 terminal a READ 2 signal, whereby OR gate 196 outputs a READ B signal and OR gate 178 outputs the READ signal to the gate 250, as shown in FIG. 2D. Then, a second set of 16 READ CS signals is applied to the NVM 48 to read out 16 further bits to be stored within the shift register 38. The decade counter 190 is, next, incremented by one to generate a SHIFT 2 signal, whereby the second group of 16 bits is shifted from the shift register 38 via the start/stop bit circuit 42, the data output modulator 24 and the inductive coupler 14 to the interrogator unit 12. As shown in FIG. 2D, the ENDAT signal is applied through the enabled AND gate 144, to shift out a bit at a time of data from the shift register 38 during the transmission interval as defined by the pulse width of the ENDAT signal. Thereafter, the decade counter 190 is incremented again to shift out a third group of 16 bits from the NVM 48 to the shift register 38, and following a further increment of the decade counter 190, a further SHIFT signal is generated by the OR gate 198 to effect transmission under the control of the ENDAT signal of the 16 bits of data, and start and stop bits as stored in the shift register 38. Upon the next incrementing of the decade counter 190, a EN3RST signal is applied to ensure that various circuits, as associated with the second or receive data mode, are appropriately initialized. Upon further incrementing of the decade counter 190, a PRGM EN signal is generated and applied via the AND gate 208 to initiate the second or data receive mode, as will now be explained.

The meter transponder 10, through the operation of its sequential control logic 28 and, in particular, its decade counter 206 functions in its second or receive data mode to transmit digital data from the interrogator unit 12 via the inductive coupler 14 to the meter transponder 10 to be demodulated. The sequential control logic 28 resets the circuit elements of the meter transponder 10 and, in particular, the circuit elements of the data sync generator 30 and pulse width modulator 26 to permit reception and demodulation of the transmitted data as appears on the clock signals CLK L1 and CLK L2, as shown respectively on the right hand side of FIGS. 3A and 3B. In the first state of the decade counter 206, the NOR gate 210 generates a DATA IN signal to be applied to the NAND gate 134, as shown in FIG. 2D, whereby the demodulated data, as derived from the pulse width demodulator 26 and, as shown in FIG. 3I, is clocked into the shift register 38. As shown in FIG. 2A, the pulse width demodulator 26 is operative in the second, receive data mode so that each third pulse of the clock signals CLK L1 and CLK L2 is pulse width modulated, i.e., a narrow third pulse is indicative of a "0", whereas a relatively wide third pulse is indicative of a "1". The second clock signal CLK L2 is applied to the divide-by-three circuit 74, whereby an output is derived from the AND gate 76 upon the occurrence of every third pulse. The output of the AND circuit 76 is applied to the clock input of the flip-flop 78, which provides a data-in-quantization interval of varying pulse width as shown in FIG. 3H. The data-in-quantization interval signal is, in turn, applied to the pulse width demodulator circuit 26 and, in particular, to the enable input E of a counter 92, whereby the counter 92 is enabled to count the pulses of the high frequency internal clock INT CLK to provide a corresponding output that is compared with a fixed count, e.g., 5, and if greater, a pulse is generated at its B<A output, as shown in FIG. 3I. In this fashion, a series of 0's and 1's may be generated upon the output of the pulse width demodulator circuit 26 and applied as a data out signal via the enabled NAND gate 134 to the shift register 38. As indicated above, this data, in an illustrative embodiment of this invention, may be indicative of the ID number as associated with the particular meter to be interrogated.

After the occurrence of a CT16 signal, which indicates 16 bits have been shifted into the shift register 38, the decade counter 206 is incremented to effect generation from the NOR gate 212 of a WRITE DI signal, which in turn generates from NOR gate 180 a WRT signal to be applied to the gate 250. As shown in FIG. 3P, the gate 250 applies 16 CS-WRT signals to the NVM 48, whereby the 16 bits of data are shifted out of and transferred from the shift register 38 via the input DI to the RAM of the NVM 48. Upon successive incrementing of the decade counter 206, a DATA I2 signal and then a WR-DI2 signal will be generated to effect the transfer of a second group of 16 bits of data into the shift register 38 and therefrom into the NVM 48. Similarly, upon the next two incrementings of the decade counter 206, DATA I3 and WR-DI3 signals will be generated to transfer data into the shift register 38 and, therefrom, into the NVM 48. Upon the subsequent increment of the decade counter 206, a store signal STR DI will be generated, whereby a signal will be applied to the STORE input of the NVM 48 to transfer the data within the RAM to the shadow or non-volatile memory of the NVM 48. Upon the occurrence of the subsequent increment, a delay period will be implemented before a second store signal STR D2 is generated to apply a second signal to the store input STORE of the NVM 48, whereby the data is again transferred from the RAM to the shadow or non-volatile memory of the NVM 48. In this manner, the decade counter 206 controls the sequence of operations of data demodulation by the pulse width demodulator 26, the shifting of data via the data gate 36 into the shift register 38 and thereafter the sequential shifting of data from the shift register 38 into the NVM 48. It is understood that three distinct sets of operations occur wherein 16 bits of data are handled at a time.

The frequency and wave form of the complimentary clock signals CLK 1 and CLK L2, as shown in FIGS. 3A and 3B, are determined based upon considerations not only of the inductive coupler 14, but also of the processing of the data by the meter transponder 10. First, the frequency of the complimentary clock signals CLK L1 and CLK L2 is set illustratively to be in the order of 20 KHz. If the frequency of the clock signals CLK L1 and CLK L2 were reduced to much below 10 KHz, the efficiency of the inductive coupler 14, as illustratively identified above, would decrease, whereas if the frequency were increased much above 100 KHz, there would be difficulty in addressing and reading out data from the NVM 48. Further, the frequency of the high frequency internal clock INT CLK, as generated by the internal clock oscillator 32 and shown in FIG. 3G, is set to be in the order of 200 KHz. The frequency of the clock INT CLK is ten times that of the clock signals CLK L1 and CLK L2 in order that the pulse width demodulator 26 may operate with sufficient resolution to demodulate the interrogation signal. As explained above, the counter 92 of the pulse width demodulator 26 counts the number of pulses of the clock INT CLK to distinguish between a widened pulse and a narrowed pulse of the complimentary clock signals CLK L1 and CLK L2. By determining the frequency of the high frequency internal clock INT CLK to be ten times that of the clock signals CLK L1 and CLK L2, a high degree of resolution is achieved.

In addition, the selecting of each fourth pulse of the complimentary clock signals CLK L1 and CLK L2 to be a transmission interval pulse, permits a read out of data within a relatively short interval of time. In an illustrative embodiment of this invention, the utility consumed count and the identification manifestation of the meter are encoded by 48 bits of data. Assuming that each of the 48 bits will be read out one at a time during a corresponding transmission interval, some 192 clock pulses of the complimentary clock signals CLK L1 and CLK L2 are required to transmit the count and meter identification data within a relatively short period; when the frequency of the complimentary clock signals CLK L1 and CLK L2 is selected to be 20 KHz, the data transmission time is in the order of 10 milliseconds. Further, the selecting of each fourth pulse as the transmission interval pulse ensures that the power reference and input decoder 20 is sufficiently energized and, in particular, its capacitor C2 is sufficiently charged to energize the elements of the meter transponder 10. Thus, the complimentary clock signals CLK L1 and CLK L2 will serve to charge the capacitor C2 for 75% of the time, while reserving 25% of the time to transmit the meter data return signal.

As briefly described above, the application, by the generator 16, of a pulse indicative of the consumption of a given quantity of the measured utility is applied to the power reference and input decoder 20 to energize the meter transponder 10, whereby that pulse increments the counts stored in the NVM 48. In particular, as shown in FIG. 2A, a pulse-like signal is inductively coupled to the meter transponder 10 and, in particular, appears upon a secondary winding 16b to be applied across a diode bridge 100 comprised of diodes D7, D8, D9 and D10. The diode bridge 100 serves to rectify the input pulse-like signal and applies a DC voltage via diode D13 to appear as the energizing voltages VDD and VSS, which energize the elements of the meter transponder 10. In addition, a pulse is taken from the interconnecting node of the diodes D9 and D10 and applied across resistor R7 to develop a voltage to be and inverted by inverter 102 to provide the increment signal $\overline{INC}$ that initiates the count incrementing mode of operation.

Referring now to FIG. 2B, the increment signal INC is applied to the NOR gate 200, whereby the operation of the decade counters 206 and 190 is defeated. By contrast, the increment signal $\overline{INC}$ is applied to a NOR gate 201 to reset a decade counter 176, which is incremented by the high frequency internal clock signal INT CLK to shift the counter 176 through a sequence of states corresponding to the output signals appearing upon its terminals Q0 to Q8, whereby a corresponding set of control signals are generated. Initially, a signal RESET 1 is generated, whereby AND gate 192 generates the RESET signal which initializes the various components of the meter transponder 10. Upon the subsequent incrementation of the decade counter 176, a RECALL signal is generated and applied to the ARRAY RECALL terminal of the NVM 48, whereby the count indicative of the utility consumed is transferred from the non-volatile memory to the RAM of the NVM 48. Upon the subsequent incrementation of the decade counter 176, a READ signal is generated and applied to the address generator 44, whereby the corresponding location of the RAM is addressed and the count is read out. In this regard, the READ signal is also applied to the gate 250, as shown in FIG. 2C, whereby 16 pulses are applied to the $\overline{CS}$ input of the NVM 48 to transmit the 16 bits of the count data to the shift register 38. Upon the subsequent incrementing of the decade counter 176, an ADD command is generated and applied via the AND gate 130, as shown in FIG. 2D, to cause the shift register 38 to transfer the utility consumed count in parallel to the adder 40, which increments the count by one before transferring the incremented count in parallel back to the shift register 38. Upon the subsequent incrementation of the decade counter 176, a WRITE command is generated, whereby the data is sequentially shifted from the shift register 38 into the RAM of the NVM 48. Upon the occurrence of the next incrementation, the decade counter 176 generates a signal STORE 1, whereby a signal STR is applied to the $\overline{STORE}$ input of the NVM 48 to transfer the contents of the RAM to the non-volatile memory of the NVM 48. After a suitable delay, a second signal STORE 2 is generated and the data is redundantly transferred from the RAM to the non-volatile memory of the NVM 48. After a further delay, the circuitry of the meter transponder 10 is de-energized.

Referring now to FIGS. 4 and 5A to 5F, there is shown respectively the detailed circuit elements of the interrogator unit 12, as well as the wave form of the signals developed at various points within the circuitry of the interrogator unit 12. The interrogator unit 12 generates and applies to the primary winding 14a of the inductive coupler 14 the clock signals CLK L1 and CLK L2, as seen respectively in FIGS. 3A and 3B. Illustratively, the interrogator unit 12 may be portable and be energized by a suitable power source such as a battery, in contrast to the meter transponder 10 whose energization depends upon the application of the interrogation or power/clock signal from the interrogator unit 12 or the application of a single pulse-like signal from the pulse generator 16, as explained above. The clocking function of the interrogator unit 12 is implemented by a switchable regulator control circuit 264, which outputs a pair of complimentary, regular square wave clock signals 01 and 02 that are respectively applied to inverters 268 and 270 to provide clock signals $\overline{01}$ and $\overline{02}$, as shown in FIGS. 5A and 5C, respectively. The clock signal $\overline{01}$ is fed back to an input of a microprocessor control circuit 254, which may illustratively take the form of that model number AIM-65 as manufactured by the assignee of this invention. The microprocessor control circuit 254 responds to these clock signals to generate $\overline{01}$ disable/enable and $\overline{02}$ disable/enable signals, as shown respectively in FIGS. 5B and 5D. A comparison of FIGS. 5A and 5B, and 5C and 5D indicates that the disable/enable signals occur upon the trailing edge of each fourth pulse of its clock signal. The timing clock signal $\overline{01}$ and its corresponding $\overline{01}$ disable/enable signal are applied to two inputs of a OR gate 272 to provide an output signal A DRIVE, as shown in FIG. 5E. Similarly, the clock signal $\overline{02}$ and the disable/enable signal $\overline{02}$ are applied to a NOR gate 274 to provide the signal B DRIVE, as shown in FIG. 5F. A comparison of FIGS. 5E and 5F to FIGS. 3A and 3B show the similarity of these signals; in particular, the output signals of the NOR gates 272 and 274 have a sequence of three negative going, relatively short pulses followed by a fourth extended positive pulse which defines, in the manner described above, the transmission interval during which signals are transmitted in the second direction from the meter transponder 10 to the interrogator unit 12.

Figure 4:
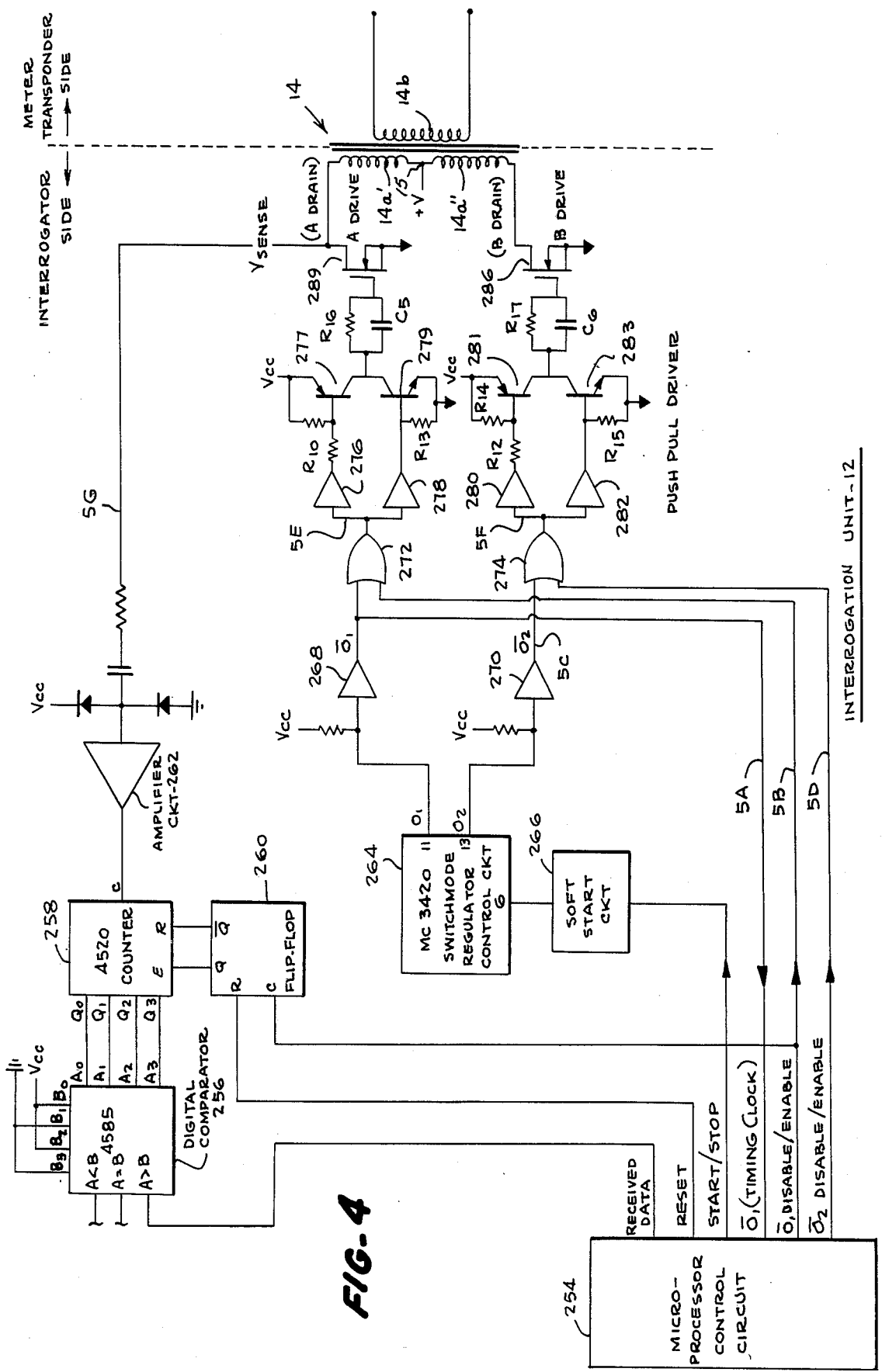
FIG. 4 is a detailed circuit diagram of the circuit elements of the interrogation unit as shown diagramatically in FIG. 1.

As shown in FIG. 4, the output of the NOR gate 272 is applied to a pair of inverters 276 and 278, which respectively drive the bases of transistors 277 and 279 as are connected in a push/pull circuit. In particular, the collectors of the transistors 277 and 279 are tied together and are coupled to the coupling circuit comprised of resistor R16 and capacitor C5 connected together in parallel. In turn, the output of the coupling circuit is applied to the gate of an FET 289, whose drain is coupled to one coil 14a' of the primary winding 14a. In similar fashion, the output of the NOR gate 274 is applied by inverters 280 and 282 to drive the bases of transistor 281 and 283. The collectors of the transistors 281 and 283 are tied together in a push/pull arrangement and are coupled to a coupling circuit comprised of resistor R17 and capacitor C16 connected together in parallel. The output of this coupling circuit is connected to the gate of an FET 286, whose drain is coupled to the other coil 14a" of the primary winding 14a. The center tap or point of interconnection of the coils 14a' and 14a" is connected to a suitable supply voltage $+V$.

The use of a center tapped inductive coupler or transformer 14 in combination with the FETs 289 and 286 ensures an efficient transfer of energy in the form of the interrogating signals, which comprise the complimentary clock signals CLK L1 and CLK L2 to be transmitted from the interrogator unit 12 to the meter transponder 10. The waveform of the clock signals CLK L1 and CLK L2 is controlled by the regulator control circuit 264 to provide non-overlapping clock signals $\overline{01}$ and $\overline{02}$, thereby reducing excessive current drain in the drive FETs 284 and 286. As shown in FIG. 4, a positive voltage $V+$ is alternately applied through first, one coil 14a' when its FET 284 is rendered conductive, and then through the coil 14a" when its FET 286 is rendered conductive. As current is drawn through, first one coil 14a' and then through the other coil 14a", flux of a corresponding polarity is generated to induce a corresponding current within the secondary coil 14b. As is well known in the art, flux is generated and coupled with the secondary winding 14b as the voltage applied to the primary winding 14a changes. Thus, the center tapped transformer provides an arrangement, whereby each complimentary clock signal CLK L1 and CLK L1 may alternately induce current within the secondary winding 14b for providing an AC voltage output.

By contrast, the interrogation signal could comprise but a single clock signal which would induce current through its primary winding each time the voltage is applied across a single primary winding. However, it can be seen that the single clock signal imposes a voltage change across its primary winding at one-half the rate at which the complimentary clock signals CLK L1 and CLK L2 are applied to the primary coils 14a' and 14a". As a result, the use of but a single clock signal proves to be only 65% as efficient in terms of transferring energy across the inductive coupler 14 as would the use of the complimentary clock signals, as explained above. The complimentary clock signals CLK L1 and CLK L2 are induced across the secondary winding 14b and applied to the diode bridge 50 which separates the signal waveforms and provides the corresponding signals CLK L1 and CLK L2 as appear on the outputs of the inverters 58 and 60, as seen in FIG. 2A. In particular, that positive portion of the complex waveform signal with respect to the voltage VSS is rectified by the diode D1 to provide the clock signal CLK L1 at the output of the node interconnecting diodes D4 and D1. Similarly, the positive portion of the complex signal appearing at the node interconnecting diodes D3 and D2 with respect to the voltage VSS is rectified by the diode D2 and is applied to the input of the inverter 60 as the clock signal CLK L2.

As shown in FIGS. 5A, 5B and 5E, the disable/enable signal 01 serves to suppress each fourth pulse of the clock signal $\overline{01}$ to provided widened pulses defining the transmission interval. Two complimentary clock signals as produced by the interrogator unit 12 of FIG. 4 are applied to the primary winding 14a as shown in FIG. 4, which permits two complimentary clock signals CLK L1 and CLK L2 to be transmitted and detected by the secondary coil 14b in a manner that imposes substantially less drain upon the battery energizing the interrogator unit 12, as explained above.

A return signal is transmitted from the meter transponder 10 in a manner as described above to provide a data clock signal having a sequence of 0's and 1's encoded thereon by the presence or absence of a high frequency burst. The presence in the transmission interval of the high frequency burst is indicative of a "1" and its absence a "0" as shown in FIG. 5G. The signal as shown in FIG. 5G appears upon the primary winding 14a and is applied to an amplifier circuit 262, whose output is applied to clock a counter 258. The counter 258 is enabled for a period of time corresponding to the transmission interval during which a high frequency signal may or may not appear. Thus, in the presence of a high frequency signal indicative of a binary bit 1, the counter 258 counts the number of the high frequency signals and provides that count to a digital comparator 256, which compares that count to a predetermined number and, if greater, indicative of the presence of the high frequency signal and an encoded "1", outputs from its A>B output a train of signals indicative of either a "0" or a "1". Though not illustrated, this sequence of "0's" and "1's" is applied to the microprocessor control circuit 254 to be stored along with the identification manifestation of the meter associated with the meter transponder unit 12 to provide data, whereby a bill may be calculated and forwarded to a particular customer. In the second or data receive mode, where data is sent from the interrogator unit 12 to the transponder 10, the microprocessor 254 presents data on the $\overline{01}$ and $\overline{02}$ enable/disable lines to be modulated. The presence of an enable/disable pulse indicates a "1", whereas the absence thereof indicates a "0".

Thus, there has been shown a method of transmitting signals through an inductive coupling system in a manner that permits bi-directional transmission of the data. In an illustrative embodiment, an interrogator unit transmits an interrogation signal in the form of a power/clock signal in a first direction through the inductive coupling system, the interrogation signal defining intervals during which data may be transmitted from the meter transponder in a second direction to the interrogator unit. In a further aspect of this invention, the interrogation signal serves to energize the circuit elements of the meter transponder. The data transmitted in the second direction may be digital in form and may be generated by selectively applying a relatively high frequency signal (with respect to the clock signal) in the defined interval. In a further aspect of this invention, data and, in particular, digital data may be transmitted in the first direction by modulating the pulse width of selected clock pulses of the interrogation signal. During the defined transmission interval, the inductive coupling system is desaturated, which permits the transmission of data in the second direction without undue expenditures of electrical energy to achieve the desired transmission. This reduction in power requirements is particularly significant where the transponder is not coupled to a ready source of energy, but rather is energized by the application of the interrogation signal. This feature is also significant where the interrogator unit is portable and is energized by a battery.

In considering this invention, it should be remembered that the present disclosure is illustrative only and the scope of the invention should be determined by the appended claims.

I claim:

1. A bi-directional, digital signal transmission system comprising:
    (a) a sole transformer having a primary winding coupled to an interrogation unit and a secondary winding coupled to a data gathering transponder unit, said transformer transmitting an interrogation signal in a first direction from said interrogation unit to said transponder unit and a data bearing response signal in a second direction from said transponder unit to said interrogation unit;
    (b) said interrogation unit comprising first means coupled to said primary winding for generating said interrogation signal, said interrogation signal comprised of a first train of regularly occurring digital clock pulses and transmission interval pulses, each transmission interval pulse defining a transmission interval for the transmission of said response signal, and means for setting the pulse width of selected of said clock pulses to form said transmission interval pulses; and
    (c) said transponder unit comprising energy conversion means coupled to said secondary winding for providing the sole energization of said transponder unit in response to said transmitted clock signals of said interrogation signal appearing at said secondary winding, and second means responsive to said selected transmission interval pulses appearing at said secondary winding for generating and applying during said transmission intervals digital signals indicative of the gathered data to said secondary winding to be transmitted via said transformer to said interrogation unit.

2. A bi-directional, digital signal transmission system comprising:
(a) a sole transformer having a primary winding coupled to an interrogation unit and a second winding coupled to a data gathering transponder unit, said transformer transmitting an interrogation signal in a first direction from said interrogation unit to said transponder unit and a data bearing response signal in a second direction from said transponder unit to said interrogation unit;
(b) said interrogation unit comprising first means coupled to said primary winding for generating said interrogation signal, said interrogation signal comprised of a first train of regularly occurring digital clock pulses and transmission intervals pulses, each transmission interval pulse defining a transmission interval for the transmission of said response signal;
(c) said transponder unit comprising energy conversion means coupled to said secondary winding for providing the sole energization of said transponder unit in response to said transmitted clock signals of said interrogation signal appearing at said secondary winding, and second means responsive to said transmission interval pulses appearing at said secondary winding for generating and applying during said transmission intervals digital signals indicative of the gathered data to said secondary winding to be transmitted via said transformer to said interrogation unit, said second means comprising detection means responsive to said interrogation signal appearing at said secondary winding for providing enable signals the response to the presence of said transmission interval pulses, a serial shift register for receiving and storing said digital signals indicative of the gathered data and responsive to each of said enable signals for shifting out a bit of said digital signals, and modulating means for modulating each bit of said gathering data signals and for applying said modulated data to said secondary winding to be transmitted via said transformer to said interrogator unit.

3. A bi-directional, digital signal transmission system comprising:
(a) a sole transformer having a primary winding coupled to an interrogation unit and a secondary winding coupled to a data gathering transponder unit, said transformer transmitting an interrogation signal in a first direction from said interrogation unit to said transponder unit and a data bearing response signal in a second direction from said transponder unit to said interrogation unit;
(b) said interrogation unit is portable and comprises first means coupled to said primary winding for generating said interrogation signal, said interrogation signal comprised of a first train of regularly occurring digital dlock pulses and transmission interval pulses, each transmission interval pulse defining a transmission interval for the transmission of said response signal, and alignment means for aligning said primary winding with respect to said secondary winding to ensure an inductive coupling therebetween; and
(c) said transponder unit comprising energy conversion means coupled to said secondary winding for providing the sole energization of said transponder unit in response to said transmitted clock signals of said interrogation signal appearing at said secondary winding, and second means responsive to said transmission intervals pulses appearing at said secondary winding for generating and applying during said transmission intervals digital signals indicative of the gathered data to said secondary winding to be transmitted via said transformer to said interrogation unit.

4. A bi-directional signal transmission system comprising:
(a) a single inductive coupling means for transmitting a first signal in a first direction from a first unit to a second unit via said inductive coupling means and a second signal in a second direction from said second unit via said inductive coupling means to said first unit;
(b) said first unit comprising first means for generating and applying said first signal to said inductive coupling means, said first signal comprising a series of pulses, selected of said pulses defining a transmission interval for the transmission of said second signal in said second direction, said first generating means generates said first signal as a train of regular clock pulses, said first generating means modulating said selected pulses to define said transmission interval; and
(c) said second unit comprising second means responsive to the occurrence of said selected pulses at said inductive coupling means for generating and applying said second signal to said inductive coupling means to be transmitted thereby during said defined transmission interval.

5. A bi-directional signal transmission system comprising:
(a) a single inductive coupling means for transmitting a first signal in a first direction from a first unit to a second unit via said inductive coupling means and a second signal in a second direction from said second unit via said inductive coupling means to said first unit;
(b) said first unit comprising first means for generating and applying said first signal to said inductive coupling means, said first signal comprising a series of pulses, selected of said pulses defining a transmission interval for the transmission of said second signal in said second direction, said first generating means generates said first signal as a sequence of regular clock pulses and said first unit further comprises means for modulating selected of said regular clock pulses with data to be transmitted to said second unit; and
(c) said second unit comprising second means responsive to the occurrence of said selected pulses at said inductive coupling means for generating and applying said second signal to said inductive coupling means to be transmitted thereby during said defined transmission interval, and means for detecting said selected modulated pulses and for demodulating said detected modulated pulses to derive an output indicative of the transmitted data.

6. A bi-directional signal transmission system comprising:
(a) single inductive coupling means for transmitting a first signal in a direction direction from a first unit to a second unit via said inductive coupling means and second signal in a second direction from said second unit via said inductive coupling means to said first unit;

(b) said first unit comprising first means for generating and applying said first signal to said inductive coupling means, said first signal comprising a series of pulses, selected of said pulses defining a transmission interval for the transmission of said second signal in said second signal in said second direction, said first generating means generates a pair of first signal, each of said first signals being complimentary to the other of said first signals, said first generating means generates each of said complimentary first signals as a train of regular clock pulses and transmission interval pulses, each transmission interval pulse defining the length of said transmission interval; and (c) said second unit comprising second means responsive to the occurrence of said selected pulses at said inductive coupling means for generating and applying said second signal to said inductive coupling means to be transmitted thereby during said defined transmission interval.

7. A bi-directional signal transmission system comprising:

(a) a single indictive coupling means for transmitting a first signal in a first direction from a first unit to a second unit via said inductive coupling means and a second signal in a second direction from said second unit via said inductive coupling means to said first unit;

(b) said first unit comprising first means for generating and applying said first signal to said inductive coupling means, said first signal comprising a timing component and a power component; and (c) said second unit comprising second means responsive to said timing component for generating said second signal to be applied to said inductive coupling means at a time to reduce the interference between said first and second signals as they are transmitted through said inductive coupling means, and energy conversion means coupled to said inductive coupling means for providing the sole energization of said second unit in response to said transmitted power component.

8. A bi-directional signal transmission system comprising:

(a) a single inductive coupling means for transmitting a first signal in a first direction from a first unit to a second unit via said inductive coupling means and a second signal in a second direction from said second unit via said inductive coupling means to said first unit;

(b) said first unit comprising first means for generating and applying said first signal to said inductive coupling means, said first signal comprising a timing component and an information component; and (c) said second unit comprising second means responsive to said timing component for generating said second signal to be applied to said inductive coupling means at a time to reduce the interference between said first and second signals as they are transmitted through said inductive coupling means, and means for receiving and utilizing said transmitted information component.

9. The bi-directional signal transmission system as claimed in claim 8, wherein said utilizing means comprises memory means for storing said transmitted information component.

10. The bi-directional signal transmission system as claimed in claim 9, wherein said first generating means generates said information component as a description of said second unit, said memory means receiving the newly transmitted description and storing it in place of a previously transmitted and stored description.

11. A bi-directional signal transmission system comprising:

(a) a single inductive coupling means for transmitting a first signal in a first direction from a first unit to a second unit via said inductive coupling means and a second signal in a second direction from said second unit via said inductive coupling means to said first unit, said single inductive coupling means comprises a first coil coupled to said first unit and a second coil coupled to said second unit, said first and second coils disposable in a first, separated relationship and in a second inductively coupled relationship to each other wherein said first and second signals may be transmittted between said first and second units;

(b) said first unit comprising first means for generating and applying said first signal to said inductive coupling means, said first signal comprising a timing component;

(c) said second unit comprising second means responsive to said timing component for generating said second signal to be applied to said inductive coupling means at a time to reduce the interference between said first and second signals as they are transmitted through said inductive coupling means; and (d) means for aligning said first and second coils, when they are disposed in their second relationshiop ensure an efficient inductive coupling therebetween.

12. A bi-directional signal transmission system comprising:

(a) a single indictive coupling means consisting of first and second coils, said first coil coupled to a first unit for transmitting a first signal in a first direction from said first unit to a seocnd unit via said inductive coupling means, said second coil coupled to a second unit for transmitting a second signal in a second direction from said second unit via said inductive coupling means to said first unit;

(b) said first unit comprising first means for generating and applying said first signal to said inductive coupling means, said first signal comprising a timing component; and (c) said second unit comprising second means responsive to said timing component for generating said second signal to be applied to said second coil of said inductive coupling means at a time, where by the second signal is inductively transmitted to said first coil without interference with said first signal.

13. A bi-directional signal transmission system comprising:

(a) a single inductive coupling means for transmitting a first signal in a first direction from a first unit to a second unit via said inductive coupling means and seocnd, binary signal in a second direction from said second unit via said inductive coupling means to said first unit;

(b) said first unit comprising first means for generating and applying said first signal to said indictive coupling means, said first signal comprising a timing component; and (c) said second unit comprising second means for generating said second, binary signal in the form of a periodic signal whose presence indicates a one value and whose absence indicates a zero value, said second means responsive to said timing component for generating said second, binary signal to be applied to said inductive coupling means at a time to reduce the interference between said first and second signals as they are transmitted through said inductive coupling means.

14. A bi-directional signal transmission system comprising:
  (a) a single inducative coupling means having a first terminal for receiving and transmitting a first signal in a first direction from a first unit to a second unit via said inductive coupling means and a second terminal for receiving and transmitting a second signal in a second direction from said second unit via said inductive coupling means to said first unit;
  (b) said first unit comprising first means coupled to said first terminal for generating and applying said first signal to said inductive coupling means said first signal comprising a series of pulses, selected of said pulses defining a transmission interval for the transmission of said second signal in said second direction when there is no current imposed by said first unit on said first terminal; and
  (c) said second unit comprising second means coupled to said second terminal and responsive to the occurrence of said selected transmission interval defining pulse at said inductive coupling means for generating and applying said second signal to said second terminal to be transmitted thereby during said defined transmission interval.

15. A bi-directional, digital signal transmission system comprising:
  (a) a sole transformer having a primary winding coupled to an interrogation unit and a secondary winding coupled to a data gathering transponder unit, said transformer transmitting an interrogation signal in a first direction from said interrogation unit to said transponder unit and a data bearing response signal in a second direction from said transponder unit to said interrogation unit;
  (b) said interrogation unit comprising first means coupled to said primary winding for generating said interrogation signal, said interrogation signal comprised of a first train of regularly occurring digital clock pulses and transmission interval pulses, each transmission interval pulse defining a transmission interval for the transmission of said response signal when no current flows through said primary winding from said interrogation unit; and
  (c) said transponder unit comprising energy conversion means coupled to said secondary winding for providing the sole energization of said transponder unit in response to said transmitted clock signals of said interrogation signal appearing at said secondary winding, and second means responsive to said transmission interval pulses appearing at said secondary winding for generating and applying during said transmission intervals digital signals indicative of the gathered data to said secondary winding to be transmitted via said trasnformer to said interrogation unit.

16. A bi-directional signal transmission system comprising:
  (a) a single inducative coupling means having a first winding coupled to a first unit and a second winding coupled to a second unit, said inductive coupling means transmitting a first signal in a first direction from said first unit to said second unit via said inductive coupling means and a second signal in a second direction from said second unit via said inductive coupling means to said first unit;
  (b) said first unit comprising first means for generating and applying said first signal to said first winding, said first signal comprising a timing component indicative of when no current flows through said first winding from said first unit; and
  (c) said second unit comprising second means responsive to said timing component for generating said second signal to be applied to said second winding of said inductive coupling means.

17. The bi-directional signal transmission system as claimed in claim 16, wherein said first means generates said first signal as a series of pulses, selected of said pulses defining a transmission interval when no current flows through said first winding from said first unit.

18. The bi-directional signal transmission system as claimed in claim 17, wherein said second unit is responsive to the occurrence of said selected pulse for generating and applying said second signal to said inductive coupling means to be transmitted thereby during said transmission interval.

19. A bi-directional signal transmission system comprising:
  (a) a single inductive coupling means consisting of first and second terminals, said first terminal coupled to a first unit for transmitting a first signal in a first direction from said first unit to said second unit via said inductive coupling means, said second terminal coupled to a second unit for transmitting a second signal in a second direction from said seocnd unit via said inductive coupling means to said first unit;
  (b) said first unit comprising first means for generating and applying said first signal to said first terminal, said first signal comprising a timing component indicative of when there is no current imposed by said first unit on said first terminal and an information component; and
  (c) said second unit comprising second means responsive to said timing component for generating said second signal to be applied to said second terminal, and means for receiving and utilizing said transmitted information component.

20. The bi-directional signal transmission system as claimed in claim 14, wherein each transmission interval pulse has width defining the interval for the transmission of said second signal in said second direction.

21. The bi-direction signal transmission system as claimed in claim 4, wherein said first generating means comprises means for selecting clock pulses of said first signal and for controlling the pulse width of said selected clock pulses to define the interval for the transmission of said second signal, said pulse width of said transmission interval defining pulses being greater than the pulse width of the remaining of said clock pulses of said first signal.

22. The bi-directional signal transmission system as claimed in claim 4, wherein said second generating means comprises clock detect means responsive to the presence at said inductive coupling means of said regular clock pulses of said first signal to generate a clock signal.

23. The bi-directional signal transmission system as claimed in claim 22, wherein said second generating means comprises means responsive to said clock signal for processing said second signal in synchronism with said clock signal.

24. The bi-directional signal transmission system as claimed in claim 22, wherein said second generating means comprises data transmission means for receiving said first signal appearing at said inductive coupling means and for selectively responding to said transmission interval pulses for transmitting said second signal during said defined transmission intervals.

25. The bi-directional signal transmission system as claimed in claim 22, wherein said second unit comprises means for modulating said second signal with data.

26. The bi-directional signal transmission system as claimed in claim 25, wherein said data modulating means comprises means for generating a high frequency signal of a frequency greater than that of said clock signal and means responsive to the data for selectively providing said high frequency signal.

27. The bi-directional signal transmission system as claimed in claim 26, wherein said second unit is responsive to said transmission interval pulses for applying said high frequency signals during said defined transmission intervals.

28. The bi-directional signal transmission system as claimed in claim 14, wherein said first unit includes means for modulating said first signal with data to be transmitted to said second unit, and said second unit comprises means for demodulating said first signal to recover said data.

29. The bi-directional signal transmission system as claimed in claim 5, wherein said modulating means pulse width modulates said selected clock pulses.

30. The bi-directional signal transmission system as claimed in claim 29, wherein said bi-directional data transmission system is operative in a first, data transmit mode and in a second, data receive mode, said first generating means operative in said first mode for selecting ones of said clock pulses to define said data transmission interval and said modulating means operative in said second mode for selecting and modulating selected ones of said clock pulses with data to be transmitted to said second unit.

31. The bi-directional signal transmission system as claimed in claim 30, wherein said second generating means is responsive in said first mode to said transmission interval defining pulses for transmitting said second signal from said second unit to said first unit.

32. The bi-directional signal transmission system as claimed in claim 31, wherein said detecting and demodulating means is operative in said second mode for detecting and demodulating said selected modulated pulses of said first signal to provide an output indicative of the data.

33. The bi-directional signal transmission system as claimed in claim 4, wherein said second unit comprises power conversion means for receiving said regular clock pulses and for utilizing at least one of said clock pulses to solely energize said second unit.

34. The bi-directional signal transmission system as claimed in claim 33, wherein said second unit comprises non-volatile memory means for storing data and means responsive to said clock pulses of said first signal for reading out and for transmitting said stored data via said inductive coupling means during said defined transmission intervals.

35. The bi-directional signal transmission system as claimed in claim 34, wherein there is included meter means responsive to utility consumption for generating pulse-like, electrical signals, each indicative of the consumption of a given quantity of the utility, said non-volatile memory means for storing an indication of the number of the pulse-like, electrical signals generated by said meter means, said indication indicative of the total measured utility consumed, said power conversion means responsive to each of said pulse-like, electrical signals to energize solely said second unit.

36. The bi-dricetional signal transmission system as claimed in claim 35, wherein said bi-directional data transmission system is operative in a first, data transmission mode and in a second, data receive mode, said first generating means operative in said first mode for selecting ones of said clock pulses of said first signal to define said data transmission intervals and including modulating means operative in said second mode for modulating selected of said clock pulses of said first signal with data to be transmitted to and stored within said non-volatile memory.

37. The bi-directional signal transmission system as claimed in claim 36, wherein said second generating means is operative in said first mode to respond to the clock pulses of said first signal appearing at said inductive coupling means for reading out said indication stored in said non-volatile memory means and for transmitting data indicative of said indication during said defined transmission intervals.

38. The bi-directional signal transmission system as claimed in claim 37, wherein said second unit comprises demodulating means operative in said second mode for detecting and demodulating said selected modulated signals and for storing the demodulated data in said non-volatile memory means.

39. The bi-directional signal transmission system as claimed in claim 14, wherein said first generating means generates a pair of first signals, each of said first signals being complimentary to the other of said first signals.

40. The bi-directional signal transmission system as claimed in claim 6, wherein said inductive coupling means comprises a transformer having a primary winding coupled to said first unit and a secondary winding coupled to said second unit, said primary winding having first and second coils connected together at a tap, said first generating means applying its pair of complimentary first clock signals respectively across said first and second coils of said tapped primary winding.

41. The bi-directional signal transmission system as claimed in claim 40, wherein said second unit comprises detection means coupled to said secondary winding for detecting and separating at least one of said complimentary first signals as transmitted from said primary winding to said secondary winding.

42. The bi-directional, digital signal transmission system as claimed in claim 1, wherein the pulse width of said transmission interval pulses is selected to be greater than the pulse width of said clock pulses to permit desaturation of said transformer to a level to permit efficient transmission of said second signal via said transformer to said interrogation unit.

43. The bi-directional, digital signal transmission system as claimed in claim 1, wherein said transponder unit comprises detection means responsive to said interrogation signal appearing at said secondary winding for providing enable signals in response to the presence of said transmission interval pulses.

44. The bi-directional, digital signal transmission system as claimed in claim 2, wherein said modulation means comprises an actuable source of a high frequency signal, the frequency of which is greater than that of said clock pulses of said interrogation signal, and means for selectively applying said high frequency signal to said secondary winding dependent upon whether said bit of said gathered data signal is a zero or a one.

45. The bi-directional, digital signal transmission system as claimed in claim 1, wherein said first generating means generates a sequence of a given number of clock pulses followed by a single transmission interval pulse, said number of clock pulses being selected to ensure the sufficient energization of said transponder unit.

46. The bi-directional, digital signal transmission system as claimed in claim 2, wherein there is included meter means responsive to utility consumption for generating pulse-like, electrical signals, each indicative of the consumption of a given quantity of the utility, said detection means coupled for receiving said pulse-like, electrical signal and responsive to said clock pulses of said interrogation signal for transferring an accumulated count of said pulse-like utility signals to said shift register.

47. The bi-directional, digital signal transmission system as claimed in claim 46, wherein there is included non-volatile memory means for storing said count of said received pulse-like, electrical signals, said detection means for receiving and storing said pulse-like, electrical signals in said non-volatile memory means, said detection means responsive to said interrogation signal for transferring said count from said non-volatile memory means to said shift register.

48. A first unit adapted for use in a bi-directional signal transmission system, further including a second unit and an inductive coupling wherein a first signal is transmitted via the inductive coupling in a first direction to the second unit and a second signal is transmitted in a second direction opposite to said first direction via the inductive coupling from the second unit, said first unit comprises:
(a) a winding comprising a separate part of the inductive coupling;
(b) first means for generating and applying said first signal to said winding, said first signal comprising a timing component indicative of when no current flows through said winding from said first unit; and
(c) second means enables by said timing component for receiving said second signal from said winding.

49. The first unit as claimed in claim 48, wherein said second means is enabled for a transmission interval by said timing component for receiving said second signal.

50. The first unit as claimed in claim 48, wherein said first means generates said first signal so as to also comprise a power component for energizing the second unit.

51. The first unit as claimed in claim 50, wherein said second means is responsive to said timing component for receiving said second signal during a transmission interval, and said first means generates said first signal to be free of said power component during said transmission interval.

52. The first unit as claimed in claim 48, wherein said first means generates said first signal to comprise a series of pulses, said first means responsive to said timing component to select certain of said pulses to define a transmission interval during which said second means is enabled to receive said second signal.

53. The first unit as claimed in claim 52, wherein said first means further comprises means for modulating said certain of said pulses to define said transmission interval.

54. The first unit as claimed in claim 48, wherein said first means generates said first signal so as to further comprise an information component.

55. The first unit as claimed in claim 54, wherein said first means generates said first signal to comprise a sequence of regular pulses, said first means responsive to said timing component to select certain of said regular pulses to define a transmission interval during which said second means is enabled to receive said second signal, and means for modulating selected of said regular pulses with information to be transmitted as said information component of said first signal to the second unit.

56. The first unit as claimed in claim 55, wherein said first means generates said first signal with a power component for energizing the second unit, said first means generates said first signal to be free of said power component during said transmission interval.

57. The first unit as claimed in claim 48, wherein the second signal is selective modulated with a burst of high frequency signals, said second means being enabled by said timing component for a transmission interval to receive the second signal and for detecting the presence or absence of said high frequency signals.

58. The first unit as claimed in claim 57, wherein said second means comprises means enabled during said transmission interval to count said high frequency signals of said burst to provide a count indicative thereof.

59. The first unit as claimed in claim 58, wherein said second means further comprises means for comparing said count with a predetermined count and, if greater, for providing an indication of the presence of said burst and, if less, for providing an indication of the absence of said burst.

60. The first unit as claimed in claim 48, wherein said first means comprises a push-pull amplifier for amplifying said first signal before applying same to said winding.

61. The first unit as claimed in claim 60, wherein said push-pull amplifier comprises first and second transistors, each having a base for receiving said first signal and collectors tied together to output said amplified first signal.

62. The first unit as claimed in claim 48, wherein said first means comprises means for generating a pair of said first signals, each of said pair of first signals comprising a train of regular pulses, which is complementary to said regular pulses of said other train.

63. The first unit as claimed in claim 62, wherein said winding comprises first and second ends and a center tap, said pair of trains of complementary regular pulses being respectively applied to said first and second ends of said winding.

64. The first unit as claimed in claim 63, wherein said first means further comprises means coupled to said first and second ends of said winding for isolating said generating means from said winding.

65. The first unit as claimed in claim 64, wherein said isolating means comprises first and second field effect transistors, each having a drain coupled to its respective of said first and second ends of said winding and gate coupled to receive respectively a corresponding one of said trains of regular pulses.

66. A second unit adapted for use in a bi-directional signal transmission system further including a first unit and an inductive coupling, wherein a first signal having a timing component is transmitted via the same inductive coupling in a first direction from the first unit and a second signal is transmitted in a second direction opposite to said first direction via the same inductive coupling to the first unit, said second unit comprises:

(a) a winding comprising a separable part of inductive coupling; and (b) means responsive to said timing component for generating said second signal bearing data and applying said second signal to said winding at a time to reduce the interference between said first and second signals as they are transmitted through the inductive coupling.

67. The second unit as claimed in claim 66, wherein said first signal further comprises a power component, and said second unit further comprises energy conversion means coupled to said winding for providing the sole energization of said second unit in response to said received power component.

68. The second unit as claimed in claim 66, wherein said second unit further comprises second means for monitoring a condition and imposing data upon said second signal indicative of the monitored condition.

69. The second unit as claimed in claim 68, wherein said second means is associated with a utility measuring meter and imposes on said second signal data corresponding to the consumed utility as read by the meter.

70. The second unit as claimed in claim 66, wherein said first signal further comprises a power component, and said second unit further comprises energy conversion means coupled to said winding for providing the sole energization of said second unit in response to said power component of said first signal.

71. The second unit as claimed in claim 66, wherein said first signal further comprises an information component, and said second unit further comprises demodulating means for detecting and demodulating said information component of said first signal.

72. A second unit adapted for use in a bi-directional signal transmission system including a first unit and an inductive coupling, wherein a first signal is transmitted via the inductive coupling in a first direction from the first unit, said first signal comprising a first train of regularly occurring clock pulses, selected of said pulses being deleted to define a transmission interval, and a second signal having a data component is transmitted in a second direction opposite to said first direction via the same inductive coupling to the first unit, said second unit comprises:

(a) a winding comprising a separable part of the inductive coupling; and (b) means for generating and applying during said transmission interval said second signal to said winding so as to reduce the interference between said first and second signals as transmitted through the inductive coupling.

73. The second unit as claimed in claim 72, wherein said generating and applying means further comprises means responsive to said selected of said pulses for initiating the generation of said second signal.

74. The second unit as claimed in claim 73, wherein there is further included energy conversion means coupled to said winding for providing the sole energization of said second unit in response to said clock pulses.

75. The second unit as claimed in 73, wherein said generating means comprises clock detect means coupled to said winding and responsive to the presence at said winding of said clock pulses of said first signal to generate a clock signal.

76. The second unit as claimed in claim 75, wherein said generating means further comprises synchronizing means responsive to said clock signal for processing said second signal in synchronism with said clock signal.

77. The second unit as claimed in claim 76, wherein said generating means further comprises means for producing a high frequency signal of a frequency greater than that of said clock signal, and means responsive to said data for selectively applying said high frequency signal to said winding.

78. A first unit adapted for use in a bi-directional signal transmission system, further including a second unit and an inductive coupling, wherein a first signal is transmitted via the inductive coupling in a first direction to the second unit and a second signal is transmitted in a second direction opposite to said first direction via the same inductive coupling from the second unit, said first unit comprises:

(a) a winding comprising a separable part of the inductive coupling;

(b) first means for generating and applying said first signal to said winding, said first signal comprising a power component and a timing component for defining a transmission interval free of said power component; and (c) second means enabled during said transmission interval for receiving said second signal when no power component is applied to said winding from said first unit.

79. A first unit adapted for use in a bi-directional signal transmission system, further including a second unit and an inductive coupling wherein a first signal is transmitted via the inductive coupling in a first direction to the second unit and a second signal is transmitted in a second direction opposite to said first direction via the same inductive coupling from the second unit, said first unit comprises:

(a) a winding comprising a separable part of the inductive coupling; and (b) means for generating and applying said first signal to said winding, said generating means comprises means for generating a train of regular clock pulses, and means for deleting selected of said clock pulses to to define a transmission interval during which the second signal is transmitted via the same inductive coupling to said winding.

80. the first unit as claimed in claim 79, wherein there is further included means coupled to said winding and enabled during said transmission interval for receiving said second signal from said winding.

81. The first unit as claimed in claim 79, wherein said generating means generates a second train of regular clock pulses, which is complementary to said first mentioned train of regular clock pulses.

82. The first unit as claimed in claim 80, wherein said winding comprises first and second ends and a center tap, said first mentioned and said second trains of complementary regular pulses being respectively applied to said first and second ends of said winding.

83. A first unit adapted for use in a bi-directional signal transmission system, further including a second unit and an inductive coupling wherein a first signal is transmitted via the inductive coupling in a first direction to the second unit and a second signal is transmitted in a second direction opposite to said first direction via the same inductive coupling from the second unit, said furnished unit comprises:
(a) a winding comprising a separable part of the inductive coupling;
(b) means for generating and applying said first signal to said winding, said generating means comprises means for generating a train of regular clock pulses, and means for selecting at periodic intervals certain of said clock pulses to define a sequence of corresponding transmission intervals during which the second signal is transmitted via the same inductive coupling to said winding; and
(c) second means enabled during each of said transmission intervals for receiving said second signal from said winding.

84. A bi-directional signal transmission system comprising:
(a) an inductive coupling comprising separable first and second windings, wherein a first signal is transmitted via said inductive coupling in a first direction and a second signal is transmitted in a second direction opposite to said first direction via said inductive coupling;
(b) a first unit comprising means for generating and applying said first signal to said first winding, said generating means comprises means for generating a train of regular clock pulses, and means for selecting at regular intervals certain of said regular clock pulses to define a sequence of corresponding transmission intervals during which said second signal is transmitted via said inductive coupling, and means enabled during each of said sequence of transmission intervals for receiving said second signal from said first winding;
(c) a second unit comprising means responsive to each of said transmission intervals for generating and applying a sequence of corresponding second signals to said second winding at time to reduce the interference between said first and second signals as they are transmitted via said inductive coupling.

85. The bi-directional signal transmission system as claimed in claim 14, wherein said inductive coupling means is saturable, said transmission interval is of a sufficient length to permit said coupling means to de-saturate to a level to permit efficient transmission of said second signal.

86. The bi-directional, digital signal transmission system as claimed in claim 15, wherein said transmission interval is of sufficient length to permit said transformer to de-saturate to a level to permit efficient transmission of said response signal to said interrogation unit.

* * * * *